United States Patent
Misra et al.

(10) Patent No.: US 12,229,902 B2
(45) Date of Patent: Feb. 18, 2025

(54) TEMPORAL IMPACT ANALYSIS OF CASCADING EVENTS ON METAVERSE-BASED ORGANIZATION AVATAR ENTITIES

(71) Applicant: ACCENTURE GLOBAL SOLUTIONS LIMITED, Dublin (IE)

(72) Inventors: Janardan Misra, Bangalore (IN); Sanjay Podder, Thane (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 296 days.

(21) Appl. No.: 17/987,281

(22) Filed: Nov. 15, 2022

(65) Prior Publication Data
US 2024/0161413 A1  May 16, 2024

(51) Int. Cl.
*G06T 19/00* (2011.01)
*G06T 13/40* (2011.01)

(52) U.S. Cl.
CPC ............ *G06T 19/006* (2013.01); *G06T 13/40* (2013.01)

(58) Field of Classification Search
None
See application file for complete search history.

(56) References Cited

U.S. PATENT DOCUMENTS

| | | | |
|---|---|---|---|
| 2012/0137367 A1* | 5/2012 | Dupont | G06F 21/00 726/25 |
| 2021/0149748 A1* | 5/2021 | Abolhassani | G06F 18/29 |
| 2022/0078198 A1* | 3/2022 | Gingras | G06F 40/295 |

* cited by examiner

*Primary Examiner* — Yi Wang
(74) *Attorney, Agent, or Firm* — Mannava & Kang, P.C.

(57) ABSTRACT

In some examples, temporal impact analysis of cascading events on metaverse-based organization avatar entities may include determining a temporal impact of a metaverse event on a specified organization avatar entity. With respect to the specified organization avatar entity, a similarity of the metaverse event may be determined in a current temporal context to past events. A reaction plan of a plurality of reaction plans may be selected from an event database and based on the determined similarity. Based on an analysis of the temporal impact with respect to the selected reaction plan, instructions may be generated to execute the selected reaction plan by a metaverse operating environment.

20 Claims, 20 Drawing Sheets

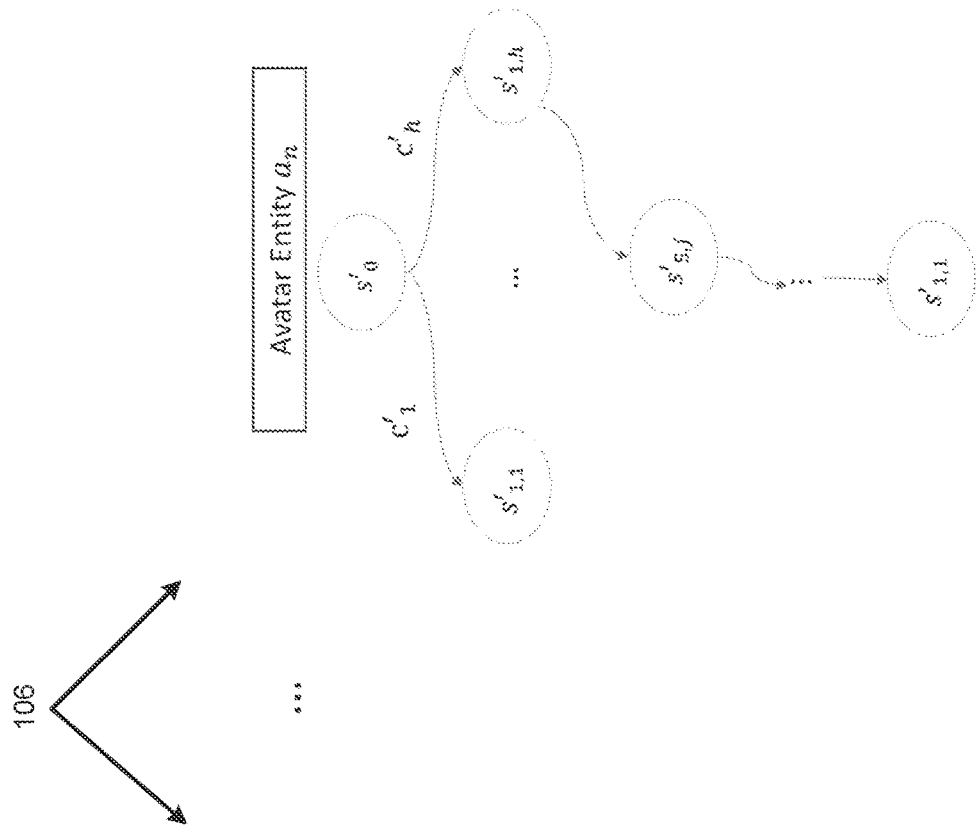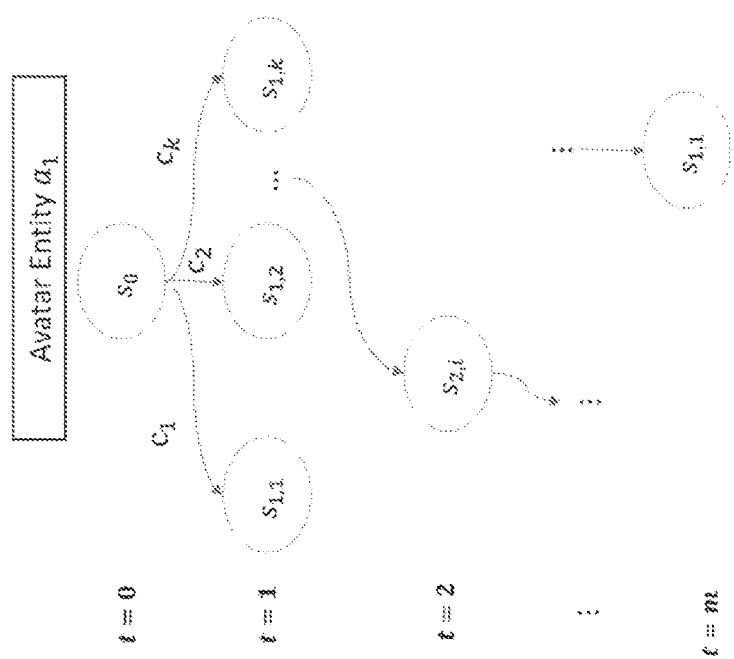
FIG. 6

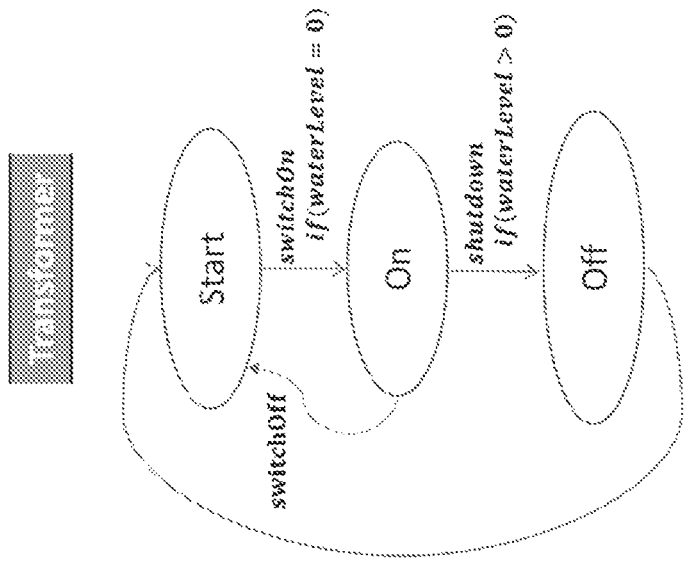
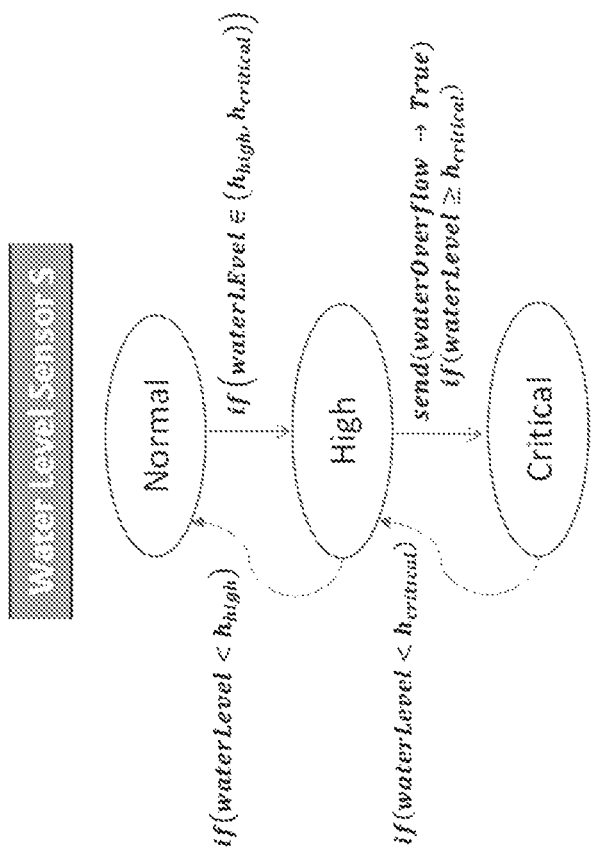
FIG. 12B

1500

DETERMINE, FOR A SPECIFIED TIME INTERVAL, A TEMPORAL IMPACT OF A METAVERSE EVENT ON A SPECIFIED ORGANIZATION AVATAR ENTITY
1502

DETERMINE, WITH RESPECT TO THE SPECIFIED ORGANIZATION AVATAR ENTITY, A SIMILARITY OF THE METAVERSE EVENT IN A CURRENT TEMPORAL CONTEXT TO PAST EVENTS
1504

SELECT, FROM AN EVENT DATABASE AND BASED ON THE DETERMINED SIMILARITY OF THE METAVERSE EVENT IN THE CURRENT TEMPORAL CONTEXT TO PAST EVENTS, A REACTION PLAN OF A PLURALITY OF REACTION PLANS THAT CORRESPONDS TO A MOST SIMILAR EVENT WITHIN A SPECIFIED THRESHOLD RANGE
1506

DETERMINE, BASED ON A SIMULATION OF THE SELECTED REACTION PLAN, A DIFFERENCE IN THE TEMPORAL IMPACT WITH AND WITHOUT THE SELECTED REACTION PLAN
1508

GENERATE INSTRUCTIONS, BASED ON A DETERMINATION THAT THE DIFFERENCE IN THE TEMPORAL IMPACT IS GREATER THAN A REACTION PLAN THRESHOLD VALUE, TO EXECUTE THE SELECTED REACTION PLAN BY A METAVERSE OPERATING ENVIRONMENT
1510

*FIG. 15*

TEMPORAL IMPACT ANALYSIS OF CASCADING EVENTS ON METAVERSE-BASED ORGANIZATION AVATAR ENTITIES

BACKGROUND

A metaverse may be described as a hypothetical immersive virtual world. The metaverse may utilize a variety of technologies such as virtual reality (VR), augmented reality (AR), artificial intelligence, machine learning, etc., to provide an immersive experience. The metaverse may be used to analyze a variety of real world concepts in a virtual world.

BRIEF DESCRIPTION OF DRAWINGS

Features of the present disclosure are illustrated by way of example and not limited in the following figure(s), in which like numerals indicate Ike elements, in which:

FIG. 6 illustrates avatar entity details to illustrate operation of the temporal impact analysis of cascading events on metaverse-based organization avatar entities apparatus of FIG. 1, in accordance with an example of the present disclosure;

FIGS. 12A-12D illustrate models of entities to illustrate operation of the temporal impact analysis of cascading events on metaverse-based organization avatar entities apparatus of FIG. 1, in accordance with an example of the present disclosure;

FIG. 15 illustrates a flowchart of an example method for temporal impact analysis of cascading events on metaverse-based organization avatar entities, in accordance with an example of the present disclosure.

DETAILED DESCRIPTION

Figure 1:
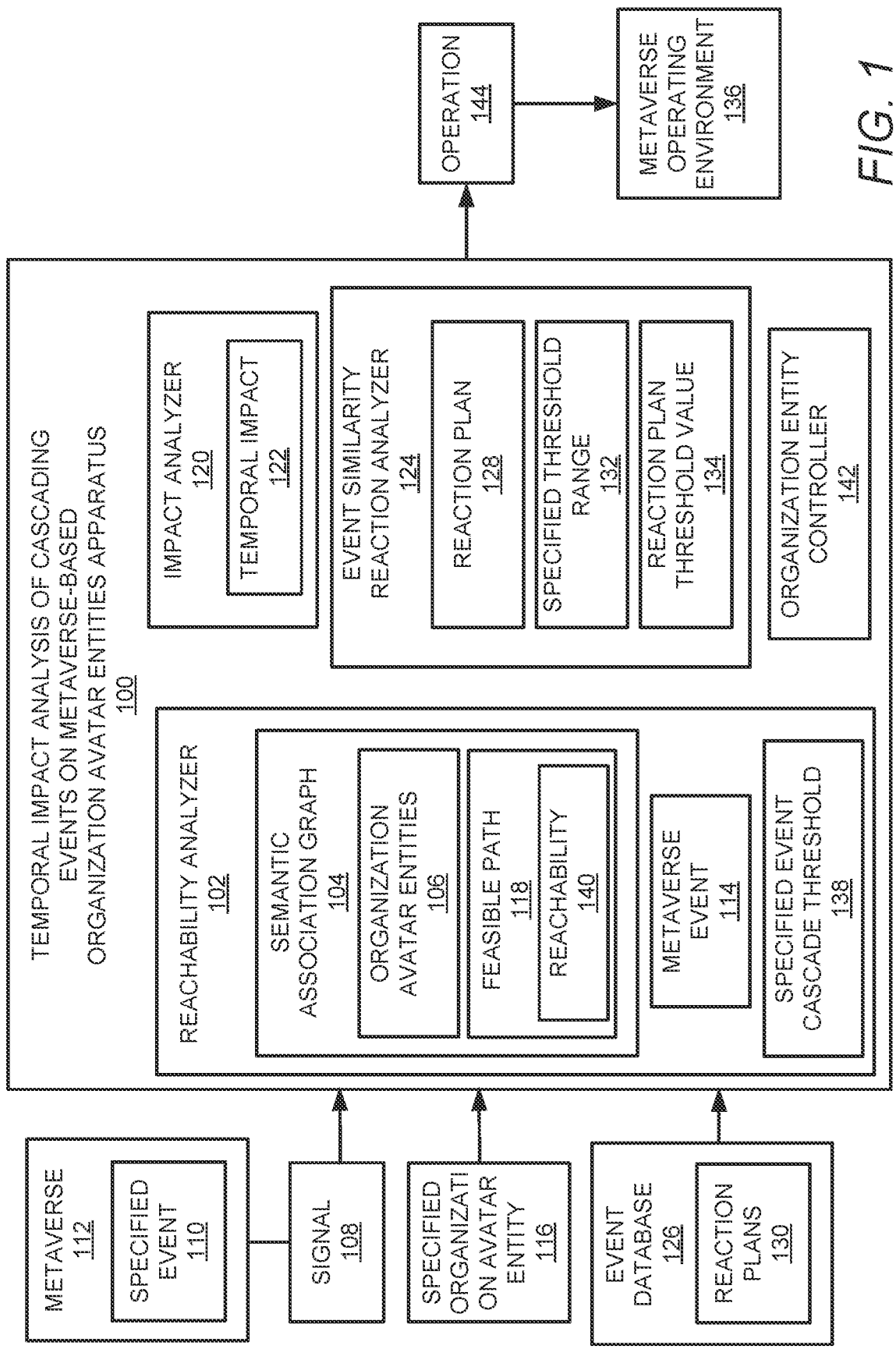
FIG. 1 illustrates a layout of a temporal impact analysis of cascading events on metaverse-based organization avatar entities apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the ten "includes" means includes but not limited to, the term "including" means including but not limited to. The term "based on" means based at least in part on.

Temporal impact analysis of cascading events on metaverse-based organization avatar entities apparatuses, methods for temporal impact analysis of cascading events on metaverse-based organization avatar entities, and non-transitory computer readable media having stored thereon machine readable instructions to provide temporal impact analysis of cascading events on metaverse-based organization avatar entities are disclosed herein. The apparatuses, methods, and non-transitory computer readable media disclosed herein provide for an automated technique for simulating propagation of an event as a cascade across semantically connected organization avatar entities (OAEs) in an environmental social and governance (ESG) metaverse, or metaverse generally, so that the event's potential impact on an entity of focus may be assessed before occurrence of the impact. A metaverse may represent a collective virtual shared space. In this regard, the term ESG as utilized herein may refer to the factors of environment, social, and governance that are used to measure sustainability. For the apparatuses, methods, and non-transitory computer readable media disclosed herein, the metaverse may include avatars of organization entities (e.g., "OAEs") as models of their real-world behaviors, and a system-of-systems model of how these OAEs interact with each other, particularly, with respect to causal chains of events. The apparatuses, methods, and non-transitory computer readable media disclosed herein may further provide for automated selection of an optimal reaction plan with respect to the potential impact from an event as disclosed herein.

For the apparatuses, methods, and non-transitory computer readable media disclosed herein, in the metaverse, once an event occurs, its plausible cascade effect may be simulated using the aforementioned models, and the impact may be analyzed before occurrence, for example, in the real-world. Based on communication of the impact analysis to corresponding real-world ESG organization entities, an optimum mitigation and/or amplification process may be identified for execution as disclosed herein.

The apparatuses, methods, and non-transitory computer readable media disclosed herein may further provide a technical solution to the technical problem of determining the impact of cascading events in a metaverse of organization entities and their organization environments. In this regard, the technical solution provided by the apparatuses, methods, and non-transitory computer readable media disclosed herein may reduce computational resources (e.g., processor time, network bandwidth, and energy) required to mitigate and/or amplify the reaction of the organizations while dealing with the corresponding events in the physical world. Further, the apparatuses, methods, and non-transitory computer readable media disclosed herein provide for the design of a computational process for detecting cascading events in the metaverse. Once an event hypothetically occurs, the apparatuses, methods, and non-transitory computer readable media disclosed herein provide for determining its plausible effect through a simulated propagation across interconnected OAEs using these models, and assessing the event's impact and effect on the execution of mitigation or amplification plans before the event actually occurs.

According to examples disclosed herein, the apparatuses, methods, and non-transitory computer readable media disclosed herein may implement impact analysis as follows.

At the outset, a semantic association graph of OAEs may be generated by inferring associations from the interactions and identities of OAEs. Next, the apparatuses, methods, and non-transitory computer readable media disclosed herein may include receiving a signal from a metaverse interface, and identifying event characteristics. A sequence of causally connected events may be determined along a shortest feasible path. Thereafter, an effect of an event may be determined as a function of a set of state entity transitions, sets of actions taken, and outputs, A semantically closest event may be identified in a knowledge base with a maximally effective reaction plan. Thereafter, plausible effectiveness of the reaction plan may be determined. If the plausible effectiveness of the reaction plan is more than an acceptance level, the reaction plan may be communicated to an external operating environment. Finally, the operating environment may execute the reaction plan per the communication received from an impact analyzer (also designated as "ESG impact analyzer") as disclosed herein.

The apparatuses, methods, and non-transitory computer readable media disclosed herein may further provide technical improvements such as reduction in computational resources (e.g., processor time, network bandwidth, and energy) that are needed to identify an optimized event-entity interaction in the metaverse. In this regard, the energy savings may be quantified to provide a practical implementation of the apparatuses, methods, and/or non-transitory computer readable media disclosed herein. For example, energy savings may be quantified as follows:

$$\text{Energy Savings} = \frac{c_{sub}}{c_{op}} \quad \text{Equation (1)}$$

For Equation (1), EnergySavings may estimate the factor by which energy consumption is reduced by executing a system based upon the apparatuses, methods, and/or non-transitory computer readable media disclosed herein, in comparison to a default scenario. For Equation (1), $c_{sub}$ may represent a number of atomic compute steps for executing suboptimal reactions on event occurrence. In this regard, $c_{sub}$ may estimate energy expense of a default scenario (without the system based on the apparatuses, methods, and/or non-transitory computer readable media disclosed herein), where an organization avatar entity executes suboptimal reactions when an event cascades to it. Further, for Equation (1), $c_{op}$ may represent a number of atomic compute steps for executing optimal reactions on event occurrence. In this regard, $c_{op}$ may estimate the energy expense of executing reactions as per a system based on the apparatuses, methods, and/or non-transitory computer eadable media disclosed herein, where an organization avatar entity executes these interactions when an event occurs but has not cascaded to it.

For the apparatuses, methods, and non-transitory computer readable media disclosed herein, the dements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

Figure 2:
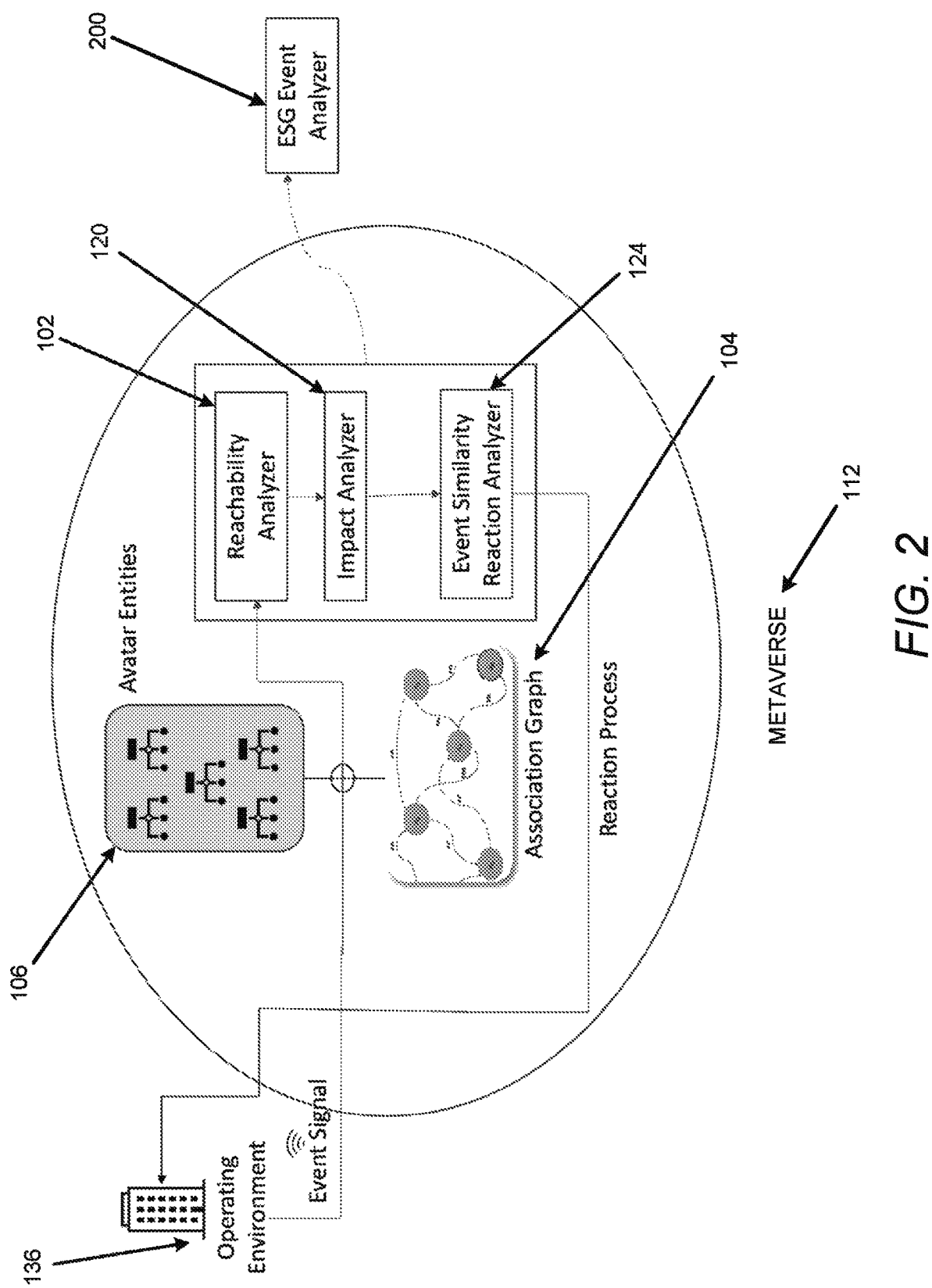
FIG. 2 illustrates an architecture of the temporal impact analysis of cascading events on metaverse-based organization avatar entities apparatus of FIG. 1, in accordance with an example of the present disclosure.

FIG. 1 illustrates a layout of an example temporal impact analysis of cascading events on metaverse-based organization avatar entities apparatus (hereinafter also referred to as "apparatus 100"). FIG. 2 illustrates an architecture of the apparatus 100, in accordance with an example of the present disclosure.

Referring to FIGS. 1 and 2, and particularly to FIG. 1, the apparatus 100 may include a reachability analyzer 102 that is executed by at least one hardware processor (e.g., the hardware processor 1402 of FIG. 14, and/or the hardware processor 1604 of FIG. 16) to generate a semantic association graph 104 of a plurality of semantically connected organization avatar entities 106. The reachability analyzer 102 may receive a signal 108 corresponding to an occurrence of a specified event 110 in a metaverse 112. The reachability analyzer 102 may determine, based on an analysis of the signal 108, a metaverse event 114 in the metaverse 112. In this regard, the specified event 110 in the metaverse 112 may be the same as the metaverse event 114 determined by the reachability analyzer 102, and may be designated as the metaverse event 114 once the signal 108 is analyzed by the reachability analyzer 102, The reachability analyzer 102 may determine, for a specified organization avatar entity 116, a feasible path 118 in the semantic association graph 104.

An impact analyzer 120 that is executed by at least one hardware processor (e.g., the hardware processor 1402 of FIG. 14, and/or the hardware processor 1604 of FIG. 16) may determine, based on the feasible path 118 and for a specified time interval, a temporal impact 122 of the metaverse event 114 on the specified organization avatar entity 116.

An event similarity reaction analyzer 124 that is executed by at least one hardware processor (e.g., the hardware processor 1402 of FIG. 14, and/or the hardware processor 1604 of FIG. 16) may determine, with respect to the specified organization avatar entity 116, a similarity of the metaverse event 114 in a current temporal context to past events. The event similarity reaction analyzer 124 may select, from an event database 126 and based on the determined similarity of the metaverse event 114 in the current temporal context to past events, a reaction plan 128 of a plurality of reaction plans 130 that corresponds to a most similar event within a specified threshold range 132. The event similarity reaction analyzer 124 may determine, based on simulation of the selected reaction plan 128, a difference in the temporal impact 122 with and without the selected reaction plan 128. The event similarity reaction analyzer 124 may forward, based on a determination that the difference in the temporal impact 122 is greater than a reaction plan threshold value 134, the selected reaction plan 128 to a metaverse operating environment 136, Further, the event similarity reaction analyzer 124 may generate an instruction to execute, by the metaverse operating environment 136, the selected reaction plan 128.

According to examples disclosed herein, the reachability analyzer 102 may determine, for the semantic association graph 104, a sequence of logically connected properties by applying at least one derivation procedure, Each logically connected property may correspond to a causally connected event.

According to examples disclosed herein, the reachability analyzer 102 may generate the semantic association graph 104 of the plurality of semantically connected organization avatar entities 106 by representing associations between the organization avatar entities 106 as edges. Further, the reachability analyzer 102 may represent strengths of the associations between the organization avatar entities 106 as weights of the edges.

According to examples disclosed herein, the reachability analyzer 102 may determine, for the specified organization avatar entity 116, paths in the semantic association graph 104 from a set of specified entities to the specified organization avatar entity 116. The reachability analyzer 102 may determine a likelihood of cascading of the metaverse event 114 along each path of the determined paths. The reachability analyzer 102 may designate, based on the determined likelihood of cascading, each path of the determined paths for which an event cascade likelihood is greater than a specified event cascade threshold 138 as a feasible path. Further, the reachability analyzer 102 may determine, for each feasible path, a reachability 140. In this regard, the reachability analyzer 102 may select, based on the determined reachability for each feasible path, a feasible path that includes a maximum reachability as the feasible path 118 for the specified organization avatar entity 116.

According to examples disclosed herein, the impact analyzer 120 may determine, for the feasible path that includes the maximum reachability, if there exists a sequence of logically connected properties that are in successive states of entities along the feasible path.

According to examples disclosed herein, the impact analyzer 120 may determine, based on a determination that the signal 108 reaches the specified organization avatar entity 116, a plurality of state transitions until the specified organization avatar entity 116 reaches a stationary state.

According to examples disclosed herein, the event database 126 may include states in which organization avatar entities were before occurrence of past events, states that the organization avatar entities transitioned to due to occurrence of events, the plurality of reaction plans as a set of computable actions for the organization avatar entities, and effectiveness coefficients associated with the plurality of reaction plans.

According to examples disclosed herein, the event similarity reaction analyzer 124 may generate, based on a determination that the difference in the temporal impact 122 is less than or equal to the reaction plan threshold value 134, an indication of no known feasible action.

An organization entity controller 142 that is executed by at least one hardware processor (e.g., the hardware processor 1402 of FIG. 14, and/or the hardware processor 1604 of FIG. 16) may control, for the organization avatar entity 116, an operation 144 based on the selected reaction plan 128. With respect to operations that are performed by the organization avatar entity 116, and also operations that are performed by the metaverse operating environment 136, based on the selected reaction plan 128, the organization avatar entity 116 may interact with other organization avatar entities that are connected to it as per the semantic association graph 104. Such an interaction may enable state transitions in these entities. The metaverse operating environment 136 may communicate with the entities in the physical universe with information containing the states of the organizational avatar entities as a result of these state transitions.

Operation of the apparatus 100 is described in further detail with reference to FIGS. 1-13.

Referring to FIGS. 1 and 2, the metaverse 112 may represent a computational process with sub-processes specified as follows:

$$ESG_{meta} = [\{(\alpha_1, \alpha_1(t), act(\cdot), env_1), \ldots, (\alpha_n, \alpha_n(t), act(\cdot), env_{\alpha_n})\}, env_G] \quad \text{Equation (2)}$$

For Equation (2), $\chi = \alpha_1, \ldots, \alpha_n$, may represent a set of models emulating organization entities—referred to hereinafter as organization avatar entities (OAEs). Further, for Equation (2), $\alpha_i(t)$, $act(\alpha_i, t)$, $env_{\alpha_i}$, and $env_G$ may be described as follows:

$\alpha_i(t)$: State of OAE $a_i$ at time point t $act(a_i, t)$: Set of actions, which OAE $\alpha_i$ may execute in state $a_i(t)$ at timepoint t $env_{\alpha_i}$: Operating environment of OAE $a_i$ including its semantically connected neighboring entities and plausible actions which the semantically connected neighboring entities can perform in association with $\alpha_i$ $env_G$: Global environment consisting of external entities, which can interact with entities in $\chi$ and plausible actions which the external entities can perform in association with entities in $\chi$ With respect to semantic association graphs (e.g., also referred to as "state transition graphs") as models of organization entities, computationally, each OAE in the metaverse may be modelled as the semantic association graph 104. The semantic association graph 104 may specify in which state an entity currently is, and would transition from a current state to when transition conditions are enabled.

With respect to nodes representing states of OAEs, states of OAEs may be characterized by input state variables that hold values of observable characteristics of OAEs, and output state variables that hold values of outputs produced by OAEs while performing transitions. A directed edge $u \rightarrow^c v$ may represent that if an OAE is in state u, the OAE would transit to state v if condition c holds in state u. Each transition condition c may represent a Boolean logic formula over input state variables and specify which states an OAE may transit to from a current state.

As shown in FIG. 2, an ESG event analyzer 200 may determine the potential temporal impact of a cascading event and selecting an optimum reaction plan for mitigating or amplifying the impact. The ESG event analyzer 200 may encompass the reachability analyzer 102, the impact analyzer 120, and the event similarity reaction analyzer 124.

Figure 3:
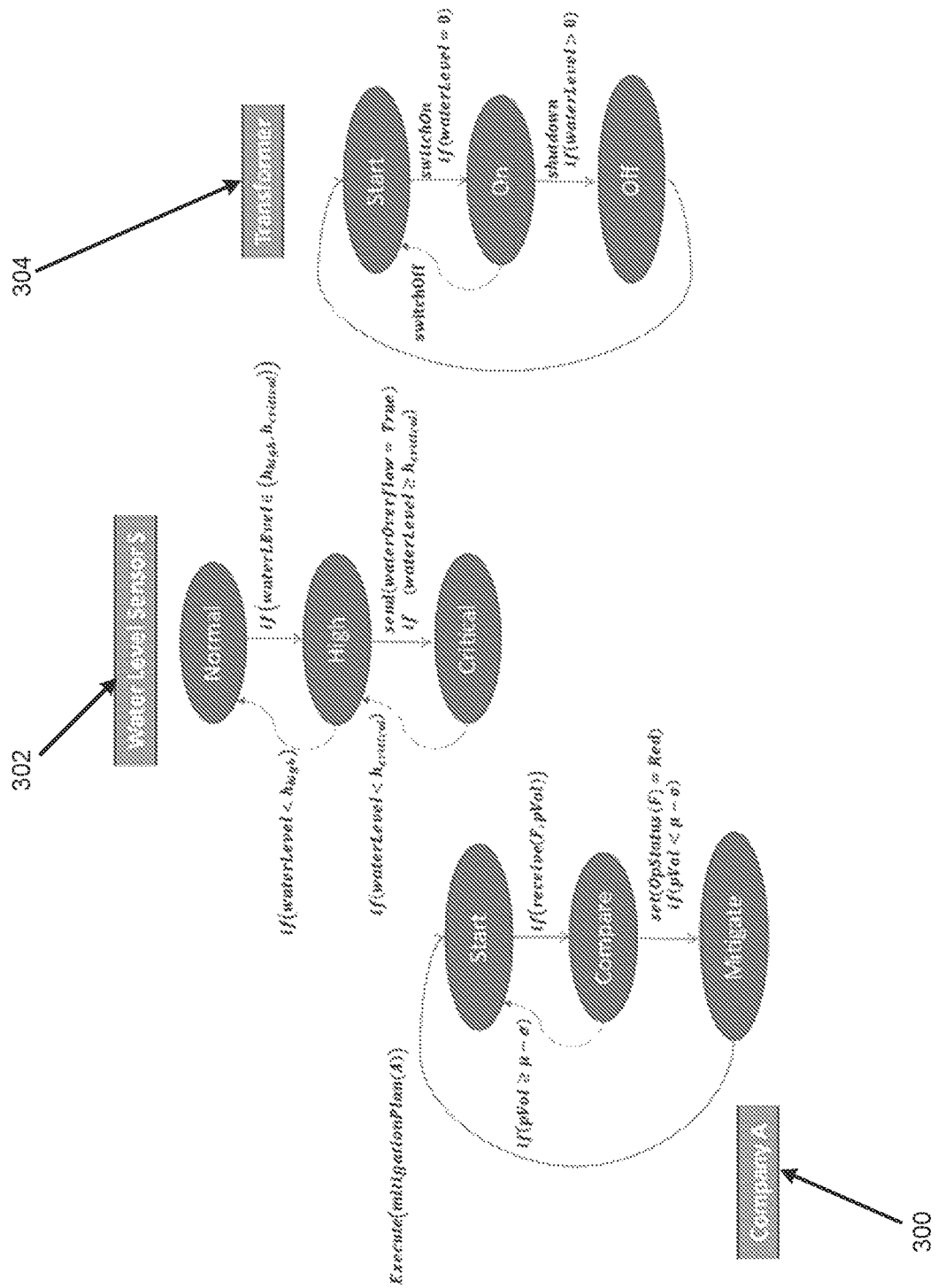
FIG. 3 illustrates organization avatar entities to illustrate operation of the temporal impact analysis of cascading events on metaverse-based organization avatar entities apparatus of FIG. 1 in accordance with an example of the present disclosure.
Figure 4:
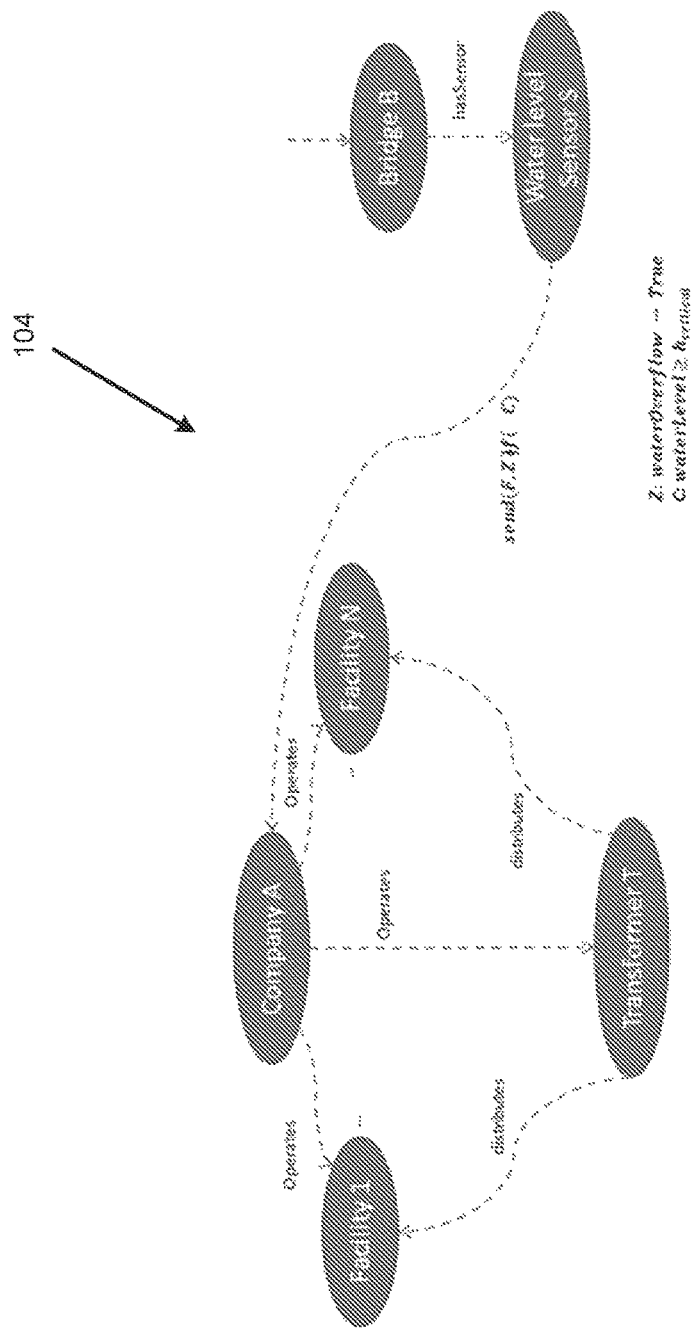
FIG. 4 illustrates a semantic association graph of the organization avatar entities of FIG. 3 to illustrate operation of the temporal impact analysis of cascading events on metaverse-based organization avatar entities apparatus of FIG. 1, in accordance with an example of the present disclosure.

Referring again to FIG. 1, as disclosed herein, the reachability analyzer 102 may generate the semantic association graph 104 of a plurality of semantically connected oraanization avatar entities 106. In this regard, FIG. 3 illustrates organization avatar entities to illustrate operation of the apparatus 100, in accordance with an example of the present disclosure. Further, FIG. 4 illustrates a semantic association graph 104 of the organization avatar entities of FIG. 3 to illustrate operation of the apparatus 100, in accordance with an example of the present disclosure.

Referring to FIG. 3, examples of the organization avatar entities 106 may be specified as follows:

Avatar Entity #1: Company A (e.g., at 300) executing production operations using electricity. Company A is located close to a river.

Avatar Entity #2: There is a bridge over the river with water level sensor S (e.g., at 302).

Avatar Entity #3: Power transformer (e.g., at 304) providing electrical supply to Company A The semantic association graph 104 (e.g., state transition graph) for the organization avatar entities 106 of FIG. 3 is shown in FIG. 4.

Figure 5:
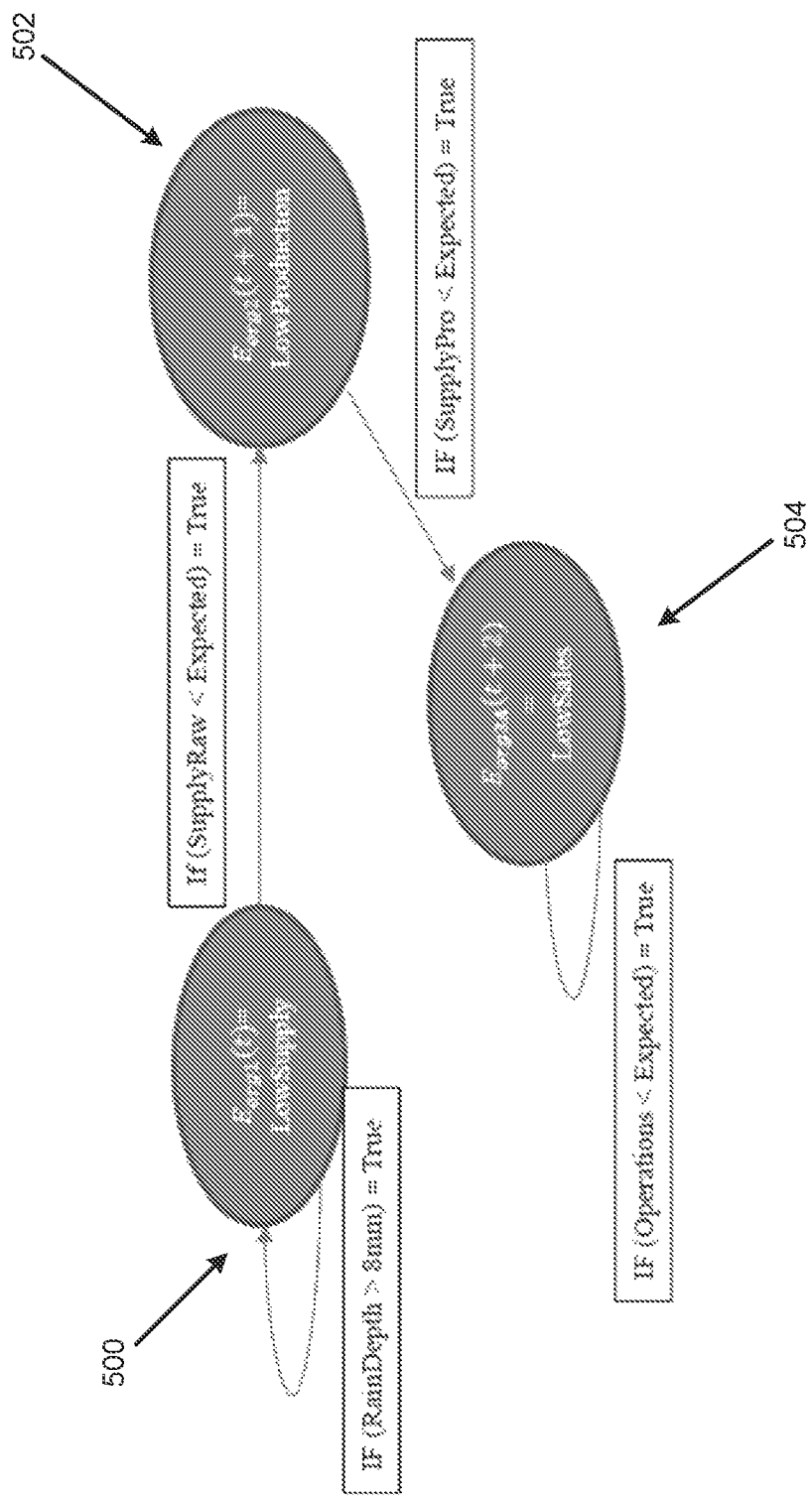
FIG. 5 illustrates state transitions of semantically connected organization avatar entities to illustrate operation of the temporal impact analysis of cascading events on metaverse-based organization avatar entities apparatus of FIG. 1, in accordance with an example of the present disclosure.

FIG. 5 illustrates state transitions of semantically connected organization avatar entities to illustrate operation of the apparatus 100, in accordance with an example of the present disclosure. For example, for goal condition IF (Sales≥µ−σ), this goal condition specifies if sale of the product would decrease by one standard deviation from the average sale of the previous years.

In this regard, with reference to FIG. 5, the state transitions may be reached by the following enabling conditions:

1. At 500, IF (RainDepth>8 mm)=True for entity $E_{org1}$ at time-point t, transition it to state=LowSupply
2. At 502, IF (SupplyRaw<Expected)=True for entity $E_{org2}$ at time-point t+1, transition it to state=LowProduction
3. At 504, IF (SupplyPro<Expected)=True for entity $E_{org3A}$ at time-point t+2, transition it to state=LowSales In state LowSales, goal condition IF (Sales≥µ−σ) is True.

FIG. 6 illustrates avatar entity details to illustrate operation of the apparatus 100, in accordance with an example of the present disclosure. In FIG. 6, both of the graphs depict semantic association graphs of different organization avatar entities 106. Both of the semantic association graphs differ in their states $s_0$ versus $s'_0$, $s_{1,k}$ versus $s'_{1,h}$, etc. In each state, different organization avatar entities 106 have a different number of state transitions. For example, for entity $\alpha_1$ state $s_0$ has k transitions whereas for entity $\alpha_n$, state $s'_0$ has h transitions. Enabling conditions for transitions for both entities are different, for example, from state $s_0$, entity $\alpha_1$ has enabling conditions as $c_1, \ldots, c_k$, whereas from state $s'_0$, entity $\alpha_n$ has enabling conditions as $c'_1, \ldots, c'_h$.

Referring again to FIG. 1, with respect to a model of the metaverse event 114 (e.g., also referred to herein as "ESG event"), an event in the metaverse 112 may be identified by a simultaneous state transition of multiple OAEs such that a specific property that characterizes the event holds true for all these entities after state transitions as follows:

$$e(A_e, t) \Rightarrow \forall \alpha_i \in A_e : P_e(s(\alpha_i, t+1)) = \text{True}$$

e is an event occurring at timepoint t $P_e$ is the property characterizing event e represented as a formula in $1^{st}$ order logic or a program $A_e = \{\alpha_1, \ldots, \alpha_n\}$ is the set of organization avaatar entities associated with the event e.

State function $s(\alpha, t)$ returns state of an entity $\alpha$ at timepoint t Occurrence of an event e at time point t involving entities in $A_e$ may imply that property $P_e$ holds for all transited states of the entities in $A_e$ at time point t+1.

With respect to a model of a cascading ESG event, a cascading ESG event may represent an ESG event (e.g., the metaverse event 114) that causally transmits across semantically related ESG avatar entities (e.g, the organization avatar entities 106) in the metaverse. The cascade effect of an event may be assessed by event properties (P*), which are causally associated with original event property ($P_e$), such that P* hold true in future time points whenever $P_e$ holds true at current timepoint t as follows:

$$P_e(s(\alpha_i, t)) \Rightarrow P^*(s(x, t^+)) \quad \text{Equation (3)}$$

For Equation (3), entity x may relate to some $\alpha_i \in A_e$ through one or more semantic associations, and a timeline may be specified as $0 \rightarrow 1 \rightarrow \ldots \rightarrow t \rightarrow t^+ \rightarrow \ldots$.

With respect to the model of the cascading ESG event (e.g., the metaverse event 114), every event may represent a degree-0 cascade event. An event e may represent a degree-1 cascade event if for more than $\alpha \in [0,1]$ fraction of OAEs affected by e (e.g., more than [α*n] fraction of $\{\alpha_1, \ldots, \alpha_n\}$), at least one of the immediately neighboring OAEs also transit to new states (e.g., at time point greater than t+1), where event property $P_e$ or its causally connected property P* holds.

With respect to the model of the cascading ESG event, $A^*_e \subseteq A_e$ may be specified to be the fraction of OAEs affected by event e such that:

$$|A_e^+| \geq \alpha |A_e|$$

With respect to the model of the cascading ESG event, for each OAE $\alpha \in A^*_e : S_\alpha$ may be specified to be the set of OAEs semantically directly connected with $\alpha$. Further, $S^*_\alpha \Rightarrow S_\alpha$ may be specified to be the subset of semantic neighbors $\alpha$ such that:

$$\frac{|S_a^*|}{|S_a|} \geq \beta_1 \in (0, 1]$$

$\beta_1 \in (0,1]$ is the minimum fraction of semantic neighbors of $\alpha$ such that, with respect to the model of the cascading ESG event, for an event e to be a degree-1 cascade event, event property $P_e$ or one of its causally connected properties may hold true in all these semantic neighbors in $S^*_\alpha$ at future timepoints $t^+$ bounded by $l_1 \geq l_2$, that is, $t < t^+ \leq t+l_1$ as follows:

For each $b \in \cup_{\alpha \in A^*_e} S^*_\alpha$:

$(Z_{t+}=\text{True}) \wedge \forall t' < t^+ : (Z_{t'}=\text{False})$ $Z_{t+} \equiv P_e(s(b,t^+)) \vee P^*(s(b,t^+))$ $Z_t \equiv P_e(s(b,t')) \vee P^*(s(b,t'))$   Equation (4)

For Equation (5), $\cup_{\alpha \in A^*_e} S^*_\alpha$ may represent the union of all of the subsets of semantic neighbors of entities in $A^*_e$. Expressed differently, $\cup_{\alpha \in A^*_e} S^*_\alpha = S^*_{\alpha_1} \cup \ldots \cup S^*_{\alpha_n}$   Equation (5)

For Equation (5), $A_e^+ = \{a_1, a_2, \ldots, a\_n\}$

With respect to the model of the cascading ESG event, by extending the semantically connected neighboring sets to the next levels of adjacencies, a degree-k cascade event may be determined. In this regard, $S_{a,k}$ may be specified to be the set of OAEs semantically connected with a by following a chain of k intermediate entities, that is, for each $x \in S_{a,k}$ there exist $x_1, \ldots x_{k-1}$ such that a is semantically connected to $x_1$, which is semantically connected to $x_2$, $x \ldots, x_{k-1}$, which is semantically connected to $x_k$, and $x_k$ is semantically connected to x as follows:

$\alpha \rightarrow x_1 \rightarrow x_2 \rightarrow \ldots \rightarrow x_k \rightarrow x$ With respect to the model of the cascading ESG event, $S_{\alpha,k}(t^+) \subseteq S_{\alpha,k}$ may be specified to be the subset of k-semantic neighbors $\alpha$ (e.g., those at distance k from $\alpha$) such that:

$$\frac{|S_{a,k}(t^+)|}{|S_{a,k}|} \geq \beta_k \in (0, 1]$$

With respect to the model of the cascading ESG event, for event e to be a degree-k cascade event, event property $P_e$ or one of its causally connected properties may need to hold true in at least one of the k-semantic neighbors, $S_\alpha(t^+)$ at some future timepoint $t^+$ bounded by $l_k \geq 1$ as follows:

$t + \Sigma_{j \in [1,k-1]} l_j < t^+ \leq t + \Sigma_{j \in [1,k]} l_j$

In this regard, for each OAE b, b may be specified as follows:

$b \in \cup_{\alpha \in A_e} S_{a,k}(t^+)$

The impact analyzer 120 may determine if the following constraint holds:

$\wedge = (Z_{t^+}=\text{True}) \wedge \forall t' < t^+ : (Z_{t'}=\text{False})$ $Z_{t^+} \equiv P_e(s(b,t^+)) \vee P^*(s(b,t^+))$ $Z_t \equiv P_e(s(b,t')) \vee P^*(s(b,t'))$ If $\wedge$ holds for b, the impact analyzer 120 may add ESG entity b to the list rImpacted$^k$.

With respect to a model of an ESG event analyzer 200, the ESG event analyzer 200 may perform steps [1]-[18] as described below. The steps [1]-[18] described below are specified to facilitate a description of operation of the apparatus 100, and not to limit the scope of operation of the apparatus 100 to the specified steps, which may be different than the order specified for the steps described below, or which may eliminate one or more of the steps described below. The steps [1]-[18] may specify the model of the ESG event analyzer 200 for determining the potential temporal impact of a cascading event and selecting an optimum reaction process for mitigating or amplifying the impact. The model for the ESG event analyzer 200 may include models of the reachability analyzer 102 (e.g., steps [1]-[9]), the impact analyzer 120 (e.g., (steps [10]-[12]), and the event similarity reaction analyzer 124 (e.g., steps 13-[18])

Figure 7:
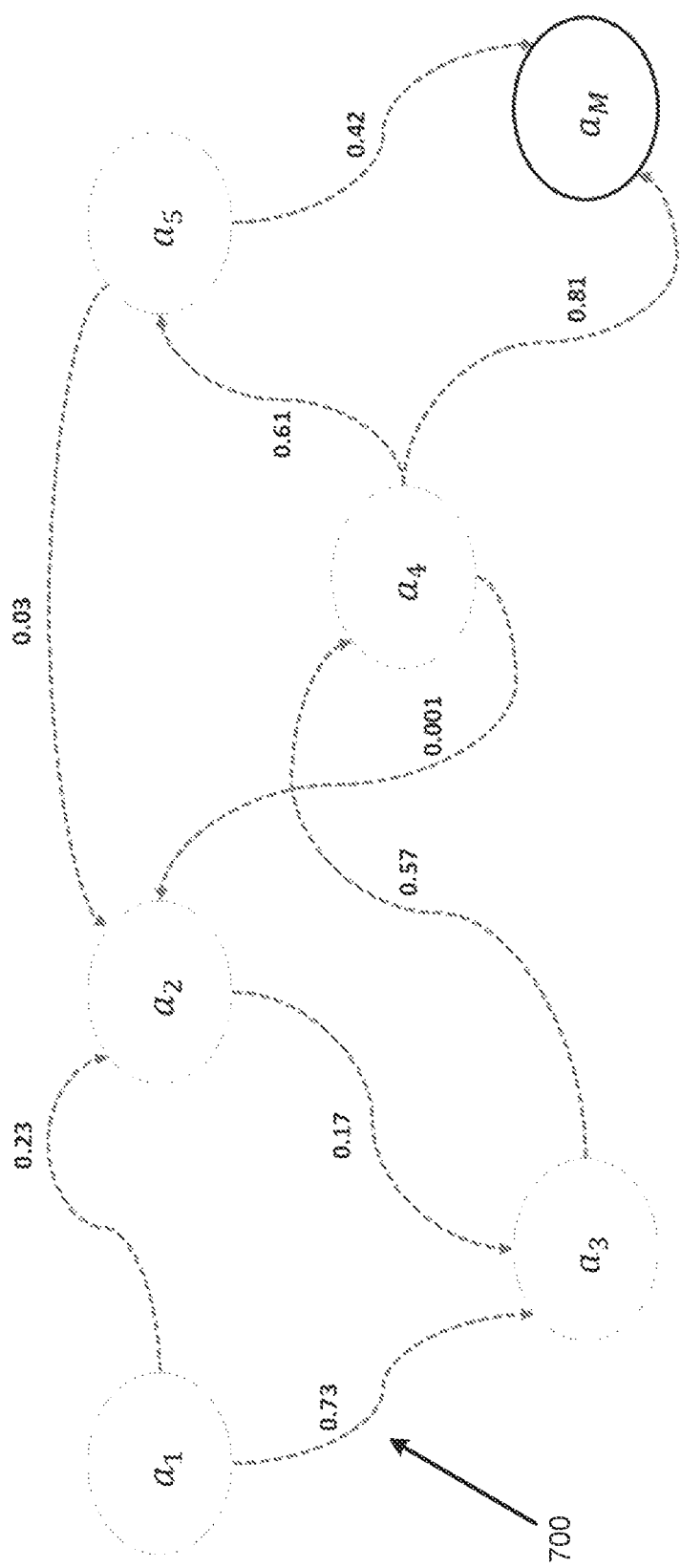
FIG. 7 illustrates a graphical illustration of event cascading from source entity to target entity to illustrate operation of the temporal impact analysis of cascading events on metaverse-based organization avatar entities apparatus of FIG. 1, in accordance with an example of the present disclosure.

FIG. 7 illustrates a graphical illustration of event cascading from source entity to target entity to illustrate operation of the apparatus 100, in accordance with an example of the present disclosure. Referring to FIGS. 1 and 7, a first step (e.g., step MD executed by the reachability analyzer 102 may include generating the semantic association graph 104 of a plurality of semantically connected organization avatar entities 106. In this regard, the reachability analyzer 102 may generate a weighted directed graph G=(V,E,w) of semantically connected OAEs in the metaverse 112 by inferring associations among OAEs from their interactions and digital identities. Edges in E may represent associations between entities along specific ESG dimensions or as specified by the design environment. Edges may represent directions that specify that events cascade from the source entity to the target entity (e.g., along the directions of the edges). The weight w(e) of an edge e may represent the strength of the semantic association between entities connected by e. Edge weights may determine how likely is it that an event may cascade through the edge (e.g., from the source entity of an edge to its target entity). For FIG. 7, as shown at 700, edge weights (e.g., 073) may determine a likelihood of an event cascading from source entity ($\alpha_1$) to target entity ($\alpha_3$).

For a next step (e.g., step [2]) executed (e.g., in the metaverse) by the reachability analyzer 102 the reachability analyzer 102 may receive the signal 108 corresponding to an occurrence of the specified event 110 in the metaverse 112. In this regard, the reachability analyzer 102 may receive a signal from a r etaverse interface on occurrence of an event $e_{real}$.

For a next step (e.g., step [3]) executed by the reachability analyzer 102, the reachability analyzer 102 may determine, based on an analysis of the signal 108, the metaverse event 114 in the metaverse 112. In this regard, the reachability analyzer 102 may execute a model of an event (e.g., e($A_e$, t)$\Rightarrow \forall \alpha_i \in A_e$: $P_e(s(\alpha_i, t+1))=\text{True}$) to determine event $e_{meta}$ in the metaverse 112 corresponding to the received event signal. The reachability analyzer 102 may populate set $A_{e_{meta}} = \{\alpha_1, \alpha_n\}$ as the set of OAEs associated with the event $e_{meta}$.

For a next step (e.g., step [4]) executed by the reachability analyzer 102, the reachability analyzer 102 may determine, for the semantic association graph 104, a sequence of logically connected properties by applying at least one derivation procedure. Each logically connected property may correspond to a causally connected event. In this regard, the reachability analyzer 102 may derive the sequence of all logically connected properties P* with $P_{e_{meta}}$ by applying derivation procedures of $1^{st}$ order logic. Each derived property may correspond to a causally connected event.

For a next step (e.g., step [5]) executed by the reachability analyzer 102, the reachability analyzer 102 may determine, for the specified organization avatar entity 116, paths in the semantic association graph 104 from a set of specified entities to the specified organization avatar entity 116. In this regard, for ESG OAE a of interest, the reachability analyzer 102 may determine all the paths in semantic association graph G from a set of entities $A_{e_{meta}}$ to $\alpha$.

For a next step (e.g., step [6]) executed by the reachability analyzer 102, the reachability analyzer 102 may determine a likelihood of cascading of the metaverse event 114 along each path of the determined paths. In this regard, the reachability analyzer 102 may estimate a likelihood of cascading of the event $e_{meta}$ along each such path using Equation (6) below, where such a path is >δ. In this regard, the path through the entities may be specified as follows;

$$T \equiv \alpha_i \xrightarrow{p_1} b_1 \xrightarrow{p_3} \ldots \xrightarrow{p_k} b_k \xrightarrow{p_\alpha} \alpha \quad \text{Equation (6)}$$

For Equation (6), $p_i$ is the likelihood of cascading of the event $e_{meta}$ through edge $\alpha_{i-1} \rightarrow \alpha_i$. With respect to $p_1, \ldots, p_k, p_\alpha$, the likelihood of event $e_{meta}$ cascading to entity $\alpha$ along path T may be specified as follows:

$$\text{EventCascadeLikelihood}(e_{meta}, T, A_{e_{meta}}, \alpha) = \min_i p_i$$

For a next step (e.g., step [7]) executed by the reachability analyzer 102, the reachability analyzer 102 may designate, based on the determined likelihood of cascading, each path of the determined paths for which an event cascade likelihood is greater than the specified event cascade threshold 138 as a feasible path. In this regard, the reachability analyzer 102 may label Path T as feasible if $$\text{EventCascadeLikelihood}(e_{meta}, T, A_{e_{meta}}, \alpha) \geq \delta \quad \text{Equation (7)}$$

For Equation (7), $\delta \in [0,1]$ may represent an event cascade threshold (default=0.3)

For a next step (e.g., step [8]) executed by the reachability analyzer 102, for each of the feasible paths, the reachability analyzer 102 may determine, for each feasible path, a reachability 140. In this regard, the reachability analyzer 102 may estimate reachability as follows:

$$\text{Reachability}(e_{meta}, T, A_{e_{meta}}, \alpha) = p_1 \times p_2 \times \ldots \times p_k \times p_\alpha$$

For a next step (e.g., step [9]) executed by the reachability analyzer 102, the reachability analyzer 102 may select, based on the determined reachability for each feasible path, a feasible path that includes a maximum reachability as the feasible path 118 for the specified organization avatar entity 116. In this regard, the reachability analyzer 102 may select the feasible path T that has a maximum Reachability( ). This path T may represent the path along which the cascade event is most likely to impact entity $\alpha$ before other feasible paths.

Figure 8:
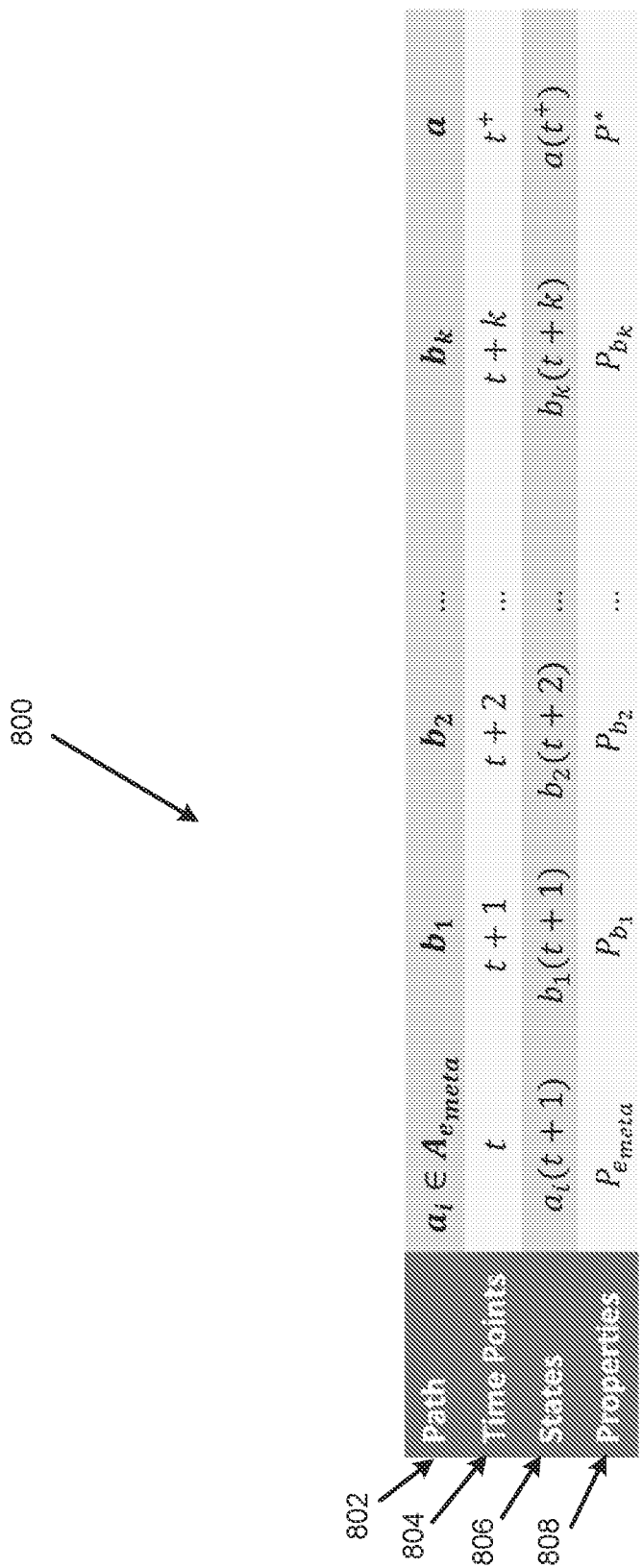
FIG. 8 illustrates a table for a sequence of logically connected properties to illustrate operation of the temporal impact analysis of cascading events on metaverse-based organization avatar entities apparatus of FIG. 1 in accordance with an example of the present disclosure.

FIG. 8 illustrates a table for a sequence of logically connected properties to illustrate operation of the apparatus 100, in accordance with an example of the present disclosure. Referring to FIG. 8, for a next step (e.g., step [10]; denoted propagation of cascading event) executed by the impact analyzer 120, the impact analyzer 120 may determine, for the feasible path that includes the maximum reachability, if there exists a sequence of logically connected properties that are in successive states of entities along the feasible path. In this regard, for the maximally likely feasible path identified in step [9], the impact analyzer 120 may determine if there exists a sequence of logically connected properties holding in the successive states of the entities along the path. In this regard, table 800 illustrates paths at 802, time points at 804, states at 806, and properties at 808.

The impact analyzer 120 may iteratively simulate propagation of an event across semantically related entities. At each time point, for all of the entities that had transited during a previous time point, the impact analyzer 120 may send event property and edge weights to their immediate semantically associated entities along edge directions. Each receiving entity may accept the message if the incoming edge strength is more than a specified threshold (≥δ), and the event property is a triggering property. If both conditions are met, the entity may transit to a new state where some other event property in the causal chain may hold.

Figure 9:
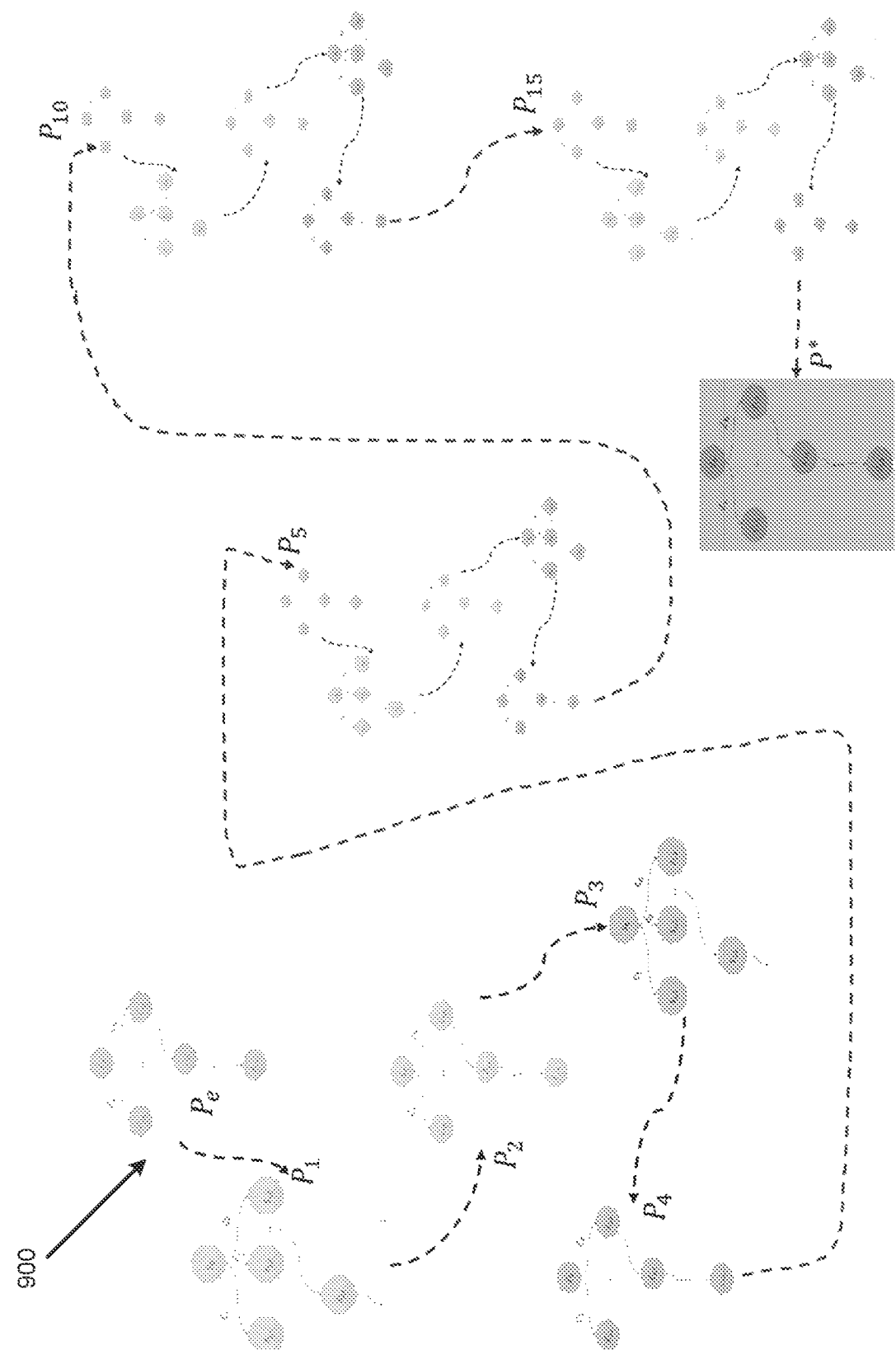
FIG. 9 illustrates a graphical illustration of event simulation across organization avatar entities to illustrate operation of the temporal impact analysis of cascading events on metaverse-based organization avatar entities apparatus of FIG. 1 in accordance with an example of the present disclosure.

FIG. 9 illustrates a graphical illustration of event simulation across organization avatar entities to illustrate operation of the apparatus 100, in accordance with an example of the present disclosure.

With respect to FIG. 9, the ESG event analyzer 200 may execute steps to perform event simulation across organization avatar entities by executing enabling conditions starting at 900 with the entity for which property $P_e$ holds and thereafter successively selecting a fraction of neighboring entities that are connected with the currently selected entity with an edge strength greater than a threshold. Further, the ESG event analyzer 200 may execute enabling conditions for those entities such that properties $P_1$, $P_2$, $P_3$, $P_4$, $P_5$, ..., $P_{10}$, ..., $P_{15}$, ... and finally $P^*$ hold for these selected entities and their enabling conditions.

Figure 10:
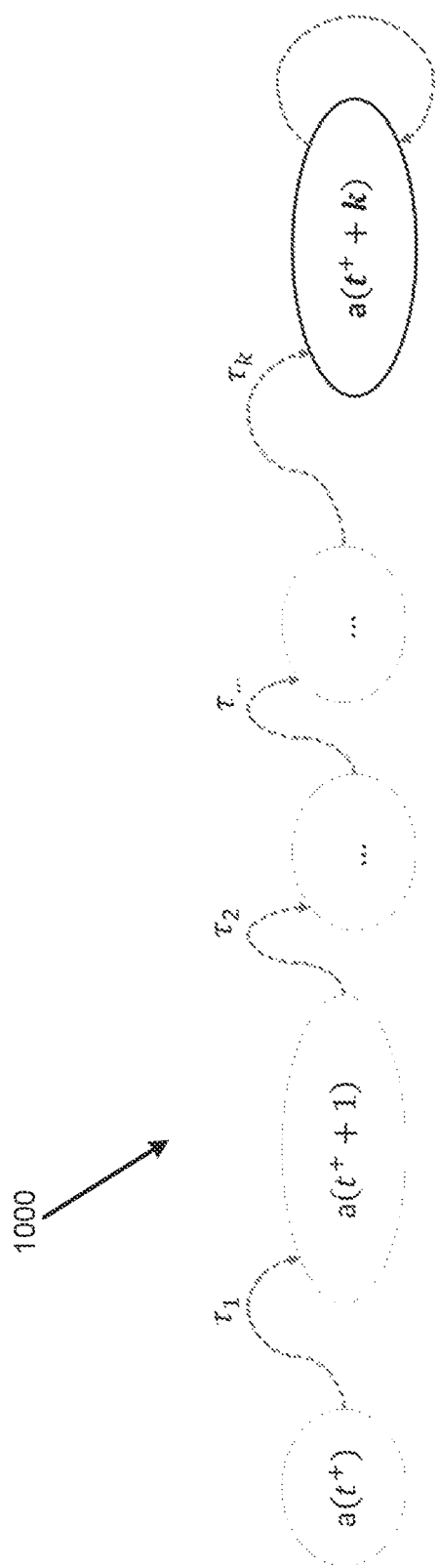
FIG. 10 illustrates state transitions to illustrate operation of the temporal impact analysis of cascading events on metaverse-based organization avatar entities apparatus of FIG. 1, in accordance with an example of the present disclosure.

FIG. 10 illustrates state transitions to illustrate operation of the apparatus 100, in accordance with an example of the present disclosure. For a next step (e.g., step [11]) executed by the impact analyzer 120, the impact analyzer 120 may determine, based on a determination that the signal 108 reaches the specified organization avatar entity 116, a plurality of state transitions until the specified organization avatar entity 116 reaches a stationary state. In this regard, when an event signal reaches the entity $\alpha$, the impact analyzer 120 may observe, as shown at 1000, its one or more state transitions until it reaches a stationary state:

$$\alpha(t^+) \xrightarrow{\tau_1} \alpha(t^++1) \xrightarrow{\tau_2} \ldots \xrightarrow{\tau_k} \alpha(t^++k) \xrightarrow{\tau_{k+1}} \ldots \xrightarrow{\tau_{k+r}} \alpha(t^++k+r)$$

such that $$\alpha(t^++k) = \alpha(t^++k+1) = \ldots = \alpha(t^++k+r)$$

In this regard, the set of all the actions that a performs during these state transitions may be specified as follows:

$$\{\tau_1, \tau_k, \ldots \tau_{k+r}\}$$

Further, the set of all the effects (e.g., outputs) that are emitted by entity $\alpha$ during these state transitions may be specified as:

$$\{0_1, \ldots 0_k, \ldots 0_{k+r}\}$$

For a next step (e.g., step [12]) executed by the impact analyzer 120, the impact analyzer 120 may determine, based on the feasible path 118 and for a specified time interval, the temporal impact 122 of the metaverse event 114 on the specified organization avatar entity 116. In this regard, the impact analyzer 120 may determine the temporal impact of event e on entity $\alpha$ during time interval $T=[t^+, t^++k+r]$ as follows:

$$\text{impact}(e, \alpha, T) = (\Psi, T, O)$$

$$\Psi = \{s(\alpha, t^+), s(\alpha, t^++1), \ldots, s(\alpha, t^++k)\}$$

$$T = \{\tau_1, \ldots \tau_k, \ldots \tau_{k+r}\}$$

$$O = \{0_1, \ldots 0_k, \ldots 0_{k+r}\}$$

For a next step (e.g., step [13]) executed by the event similarity reaction analyzer 124, the event similarity reaction analyzer 124 may perform automated selection of an optimum reaction plan. In this regard, an event database may include a state in which an OAE was before occurrence of past events (original or cascading), a state the OAE transitioned to due to the occurrence of the event, a reaction plan as set of computable actions, and an effectiveness coefficient of the reaction plan. With respect to the reaction plan as set of computable actions, the reaction plan may include a mitigation plan in case an impact is negative, or an amplification plan in case an impact is positive.

For a next step (e.g., step [14]) executed by the event similarity reaction analyzer 124, the event similarity reaction analyzer 124 may determine, with respect to the specified organization avatar entity 116, a similarity of the metaverse event 114 in a current temporal context to past events. In this regard, the event similarity reaction analyzer 124 may determine similarity of a current event in the current temporal context of the entity with past events. In this regard, similarity may be determined as a function of states before and after events.

For a next step (e.g., step [15]) executed by the event similarity reaction analyzer 124, the event similarity reaction analyzer 124 may select, from the event database 126 and based on the determined similarity of the metaverse event 114 in the current temporal context to past events, the reaction plan 128 of the plurality of reaction plans 130 that corresponds to a most similar event within the specified threshold range 132. In this regard, the event similarity reaction analyzer 124 may select a reaction plan corresponding to the most similar event within a specified threshold range (e.g., default [85, 1.00]). If multiple events are within this range, an event with a highest effectiveness coefficient may be selected.

For a next step (e.g., step [16]) executed by the event similarity reaction analyzer 124 the event similarity reaction analyzer 124 may determine, based on simulation of the selected reaction plan 128, a difference in the temporal impact 122 with and without the selected reaction plan 128.

For a next step (e.g., step [17]) executed by the event similarity reaction analyzer 124, the event similarity reaction analyzer 124 may forward, based on a determination that the difference in the temporal impact 122 is greater than the reaction plan threshold value 134, the selected reaction plan 128 to the metaverse operating environment 136. In this regard, if the difference in the impact with or without the plan is more than a specified threshold (e.g., default 10%), the event similarity reaction analyzer 124 may communicate this difference back to the metaverse operating environment 136. The event similarity reaction analyzer 124 may generate, based on a determination that the difference in the temporal impact 122 is less than or equal to the reaction plan threshold value 134, an indication of no known feasible action. That is, the event similarity reaction analyzer 124 may generate a signal to the metaverse operating environment 136 that NO_FEASIBLE_ACTION_KNOWN.

For a next step (e.g., step [18]) executed by the event similarity reaction analyzer 124, the event similarity reaction analyzer 124 may generate an instruction to execute, by the metaverse operating environment 136, the selected reaction plan 128. In this regard, the metaverse operating environment 136 may execute the reaction plan 128 as per the communication received from the ESG event analyzer 200.

Figure 11:
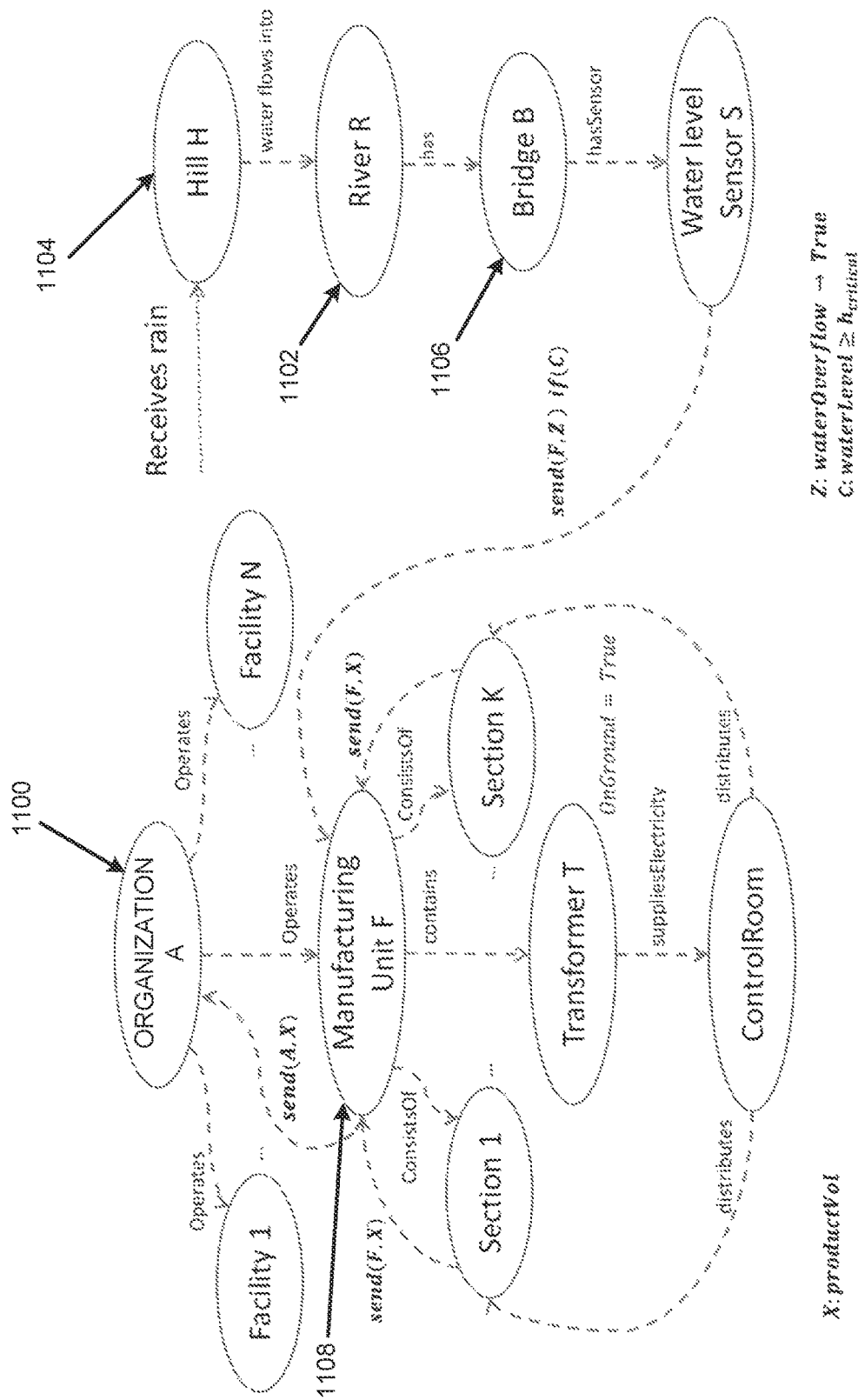
FIG. 11 illustrates a semantic association graph to illustrate operation of the temporal impact analysis of cascading events on metaverse-based organization avatar entities apparatus of FIG. 1, in accordance with an example of the present disclosure.
Figure 12A:
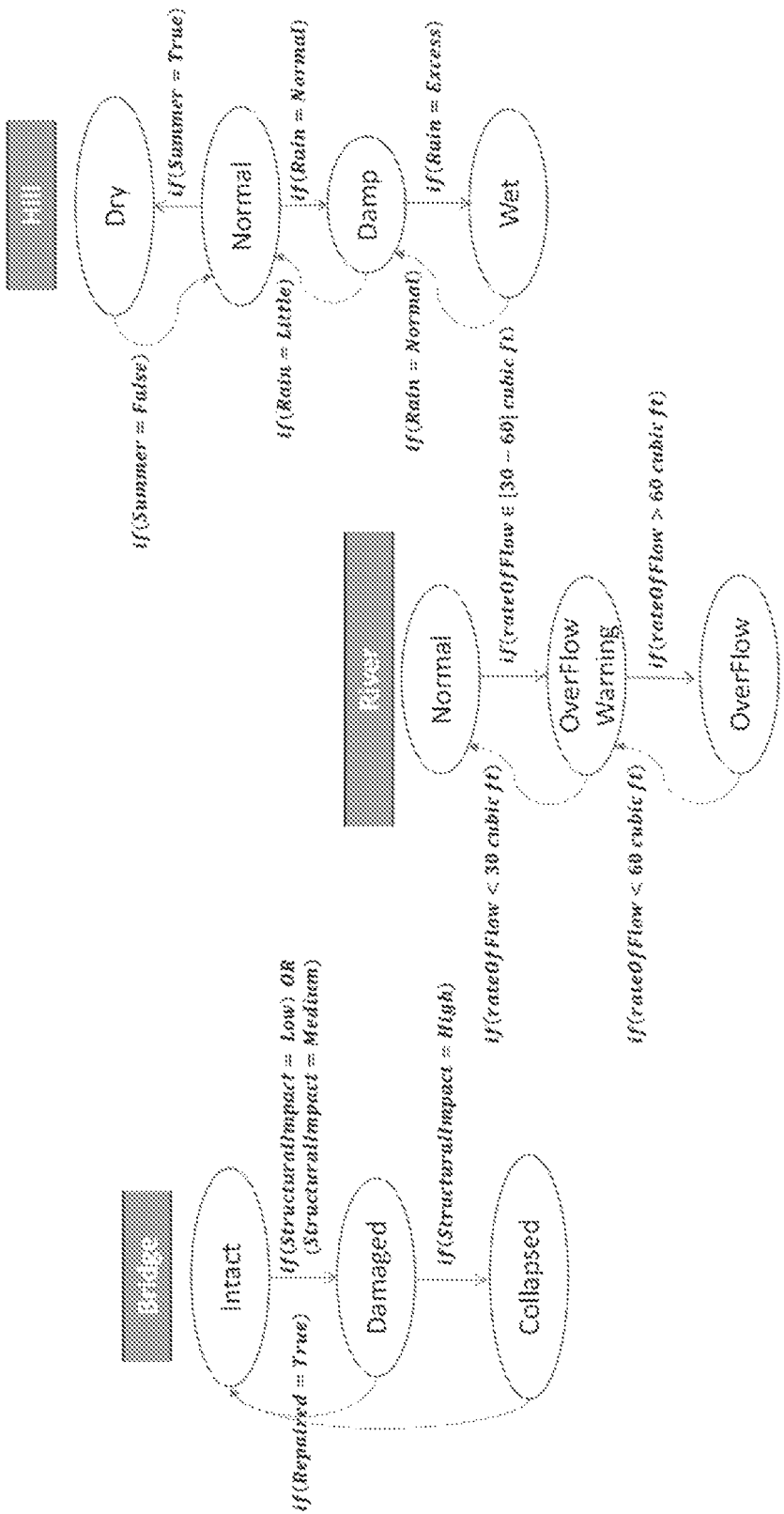
Figure 12C:
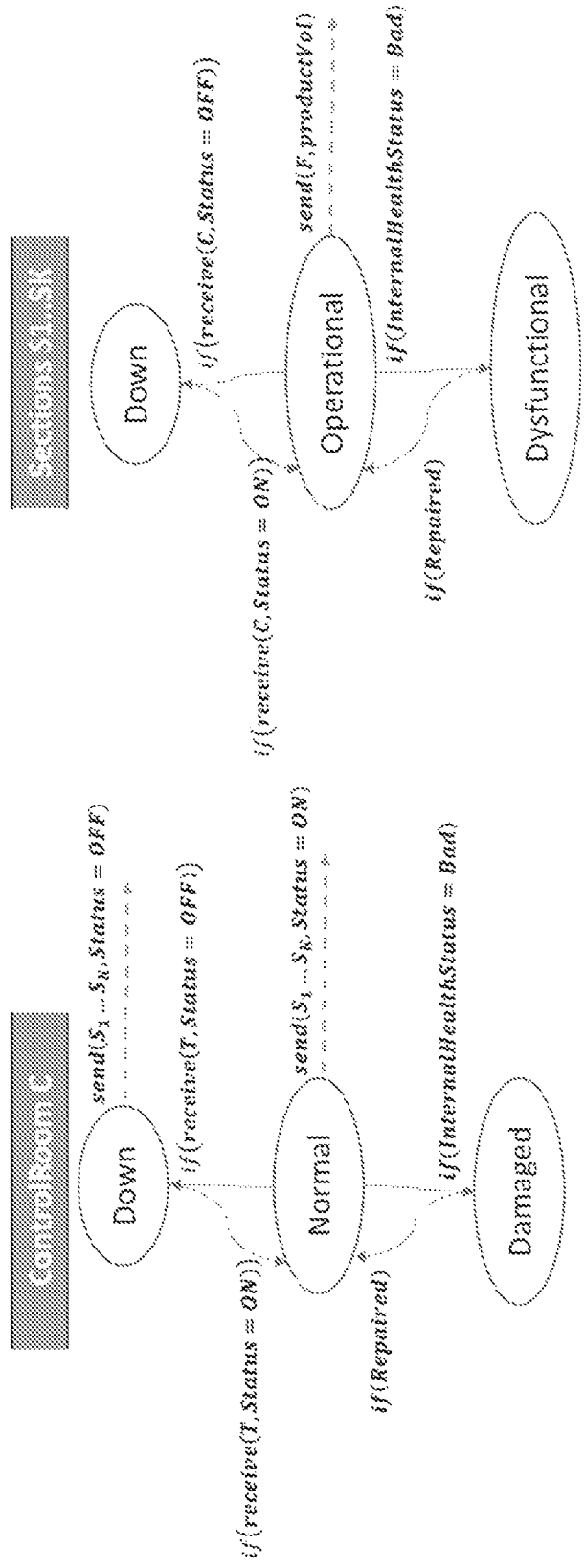
Figure 12D:
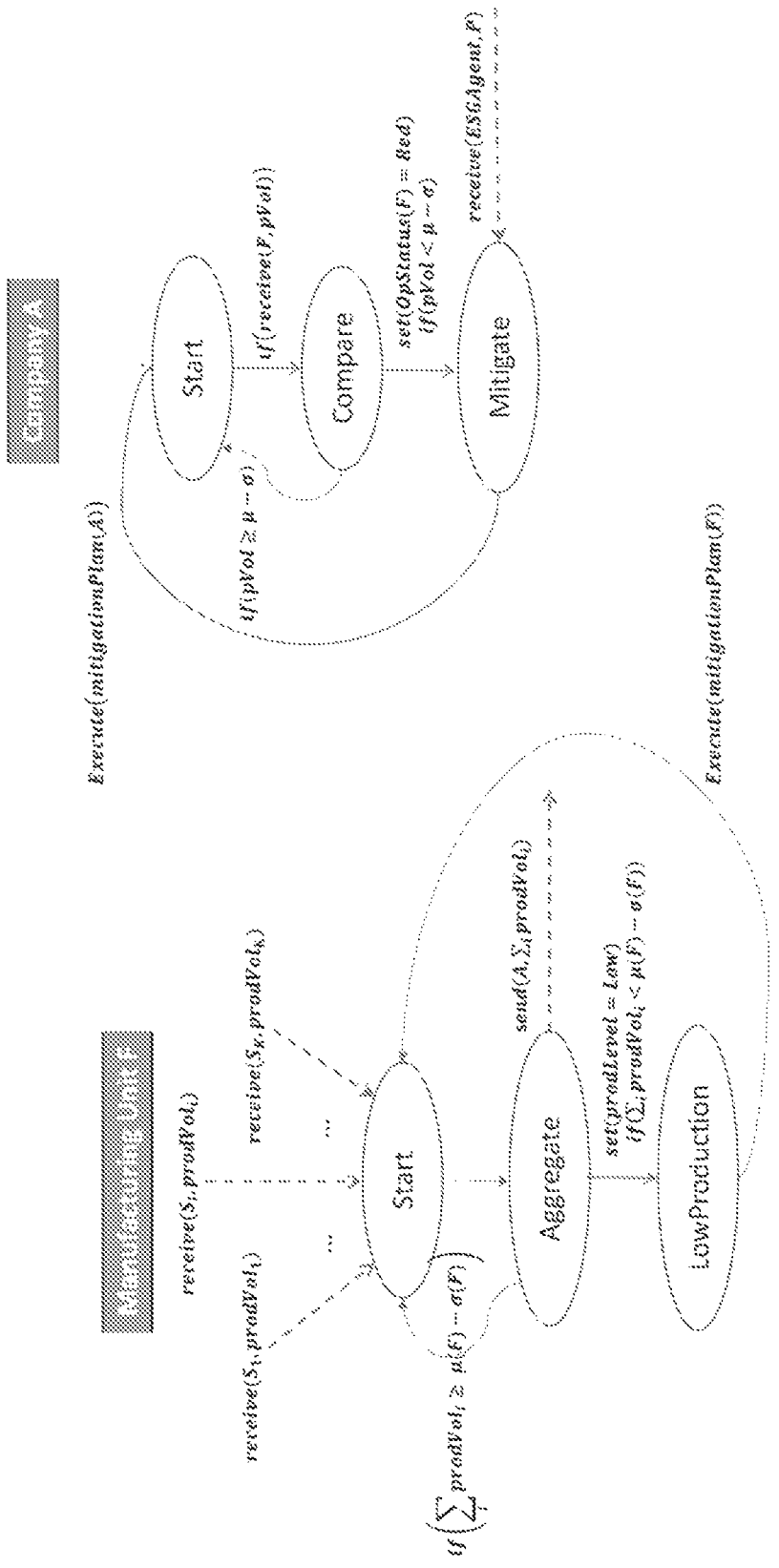

FIG. 11 illustrates a semantic association graph 104 to illustrate operation of the apparatus 100, in accordance with an example of the present disclosure. FIGS. 12A-12D illustrate models of entities to illustrate operation of the apparatus 100, in accordance with an example of the present disclosure.

For the example of FIG. 11, an organization A at 1100 may include manufacturing unit F at 1108, which is 7 Km away from a river R at 1102. River R may flow close to a hill H 1104 and during rainy season, water from the hill may flow into river R. There is a bridge B at 1106 over the river with depth sensor d. For the last 3 days, rain fall has been above average. For this case, the ESG event analyzer 200 may determine the impact of rain on organization A. Further, the ESG event analyzer 200 may determine how to best minimize the impact. Models associated with the bridge B at 1106, the river R at 1102, hill H at 1104, and the other entities shown in FIG. 11 are shown in FIGS. 12A-12D.

Figure 13:
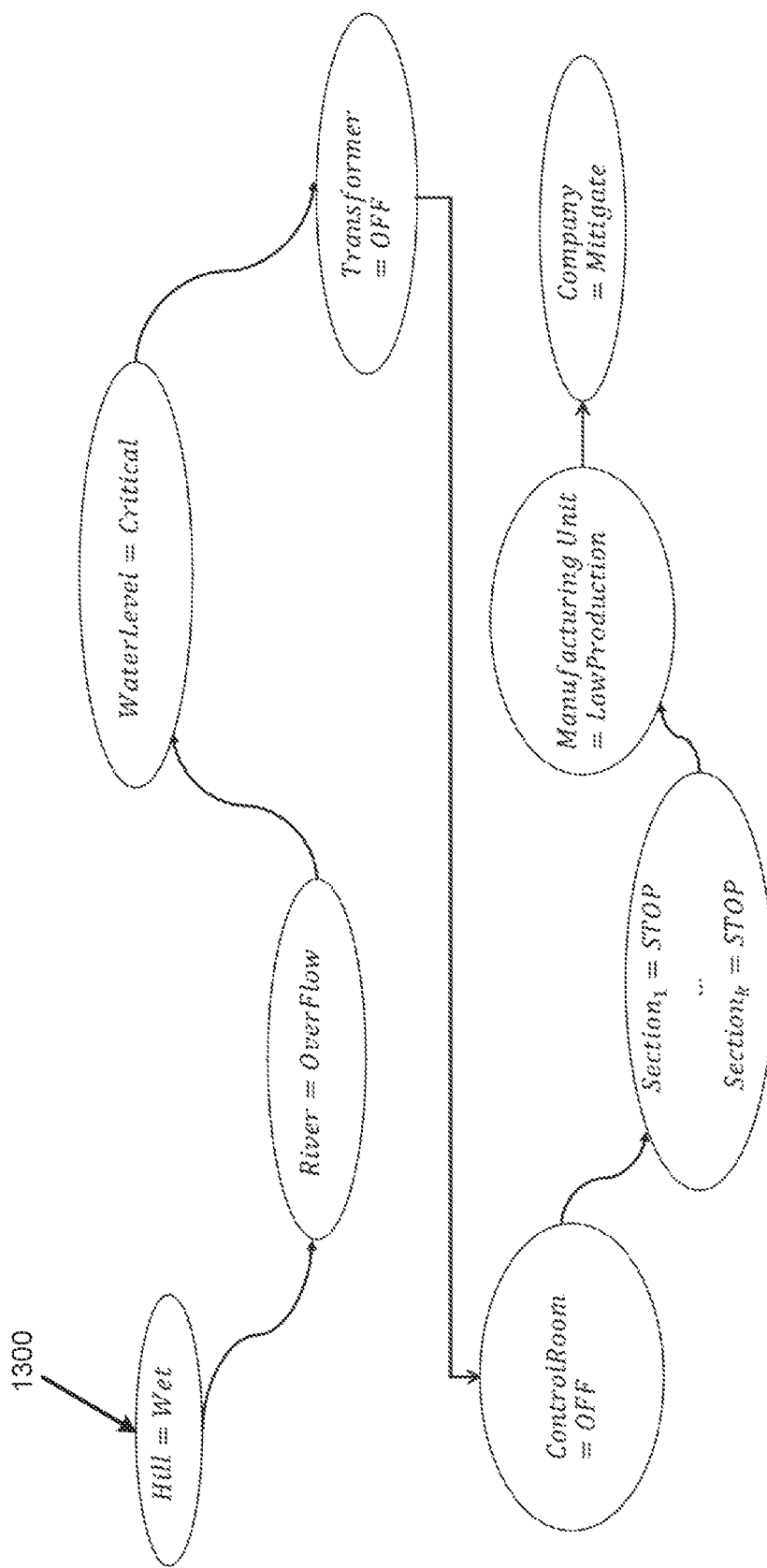
FIG. 13 illustrates cascade simulation to illustrate operation of the temporal impact analysis of cascading events on metaverse-based organization avatar entities apparatus of FIG. 1, in accordance with an example of the present disclosure.

FIG. 13 illustrates cascade simulation for the example of FIGS. 11 and 12A-12D to illustrate operation of the apparatus 100, in accordance with an example of the present disclosure, Referring to FIG. 13, cascade simulation may be specified as follows:

$$e_{rain}(\{Hill,River\},t=0) \rightarrow [excessWater(Hill(t=1))=True] \text{ AND } [excessWater(River(t=1))=True]$$

$$Hill(t=1)=wet, River(t=1)=OverFlow$$

Referring to FIG. 13, (Entity) X=(State) S may indicate that Entity X at the current time point is in State S. For example, at 1300, Hill=Wet may indicate that Hill at the current time point is in a Wet state.

For the impact analyzer 120, an impact may be specified as follows:

$$\text{impact}=|\mu-\text{prodVol}_F|*\alpha \qquad \text{Equation (8)}$$

For Equation (8), $$\mu = \frac{1}{n}\sum\nolimits_{t \in \{t_1, t_2, \ldots, t_n\}} prodVol_t$$

is the average production of the manufacturing unit F during previous years $\{t_1, t_2, \ldots, t_n\}$, prodVol$_F$ is the current total production from various sections of manufacturing facility F, and $\alpha$ is a sales factor that estimates impact on sales for each unit of production from the factory. In the context of FIGS. 11-13, an impact may estimate the sales impact of reduction in production for manufacturing unit F due to event of rain.

The reaction process may be specified as follows:
Select Facility $F_j \neq F$ and its increase production of Facility $F_j$ by factor $\beta \geq 1$ in order to compensate for the impact due to decreased production in manufacturing unit F as follows:

$$pVol_{F_j} \rightarrow \beta * pVol_{F_j}$$

In the context of FIGS. 11-13, Company A communicates to Facility $F_j$ (different from the manufacturing unit F) so that Facility $F_j$ increases its production by factor $\beta$ such that Facility $F_j$ minimizes the impact from the loss of production from manufacturing unit F.

Figure 14:
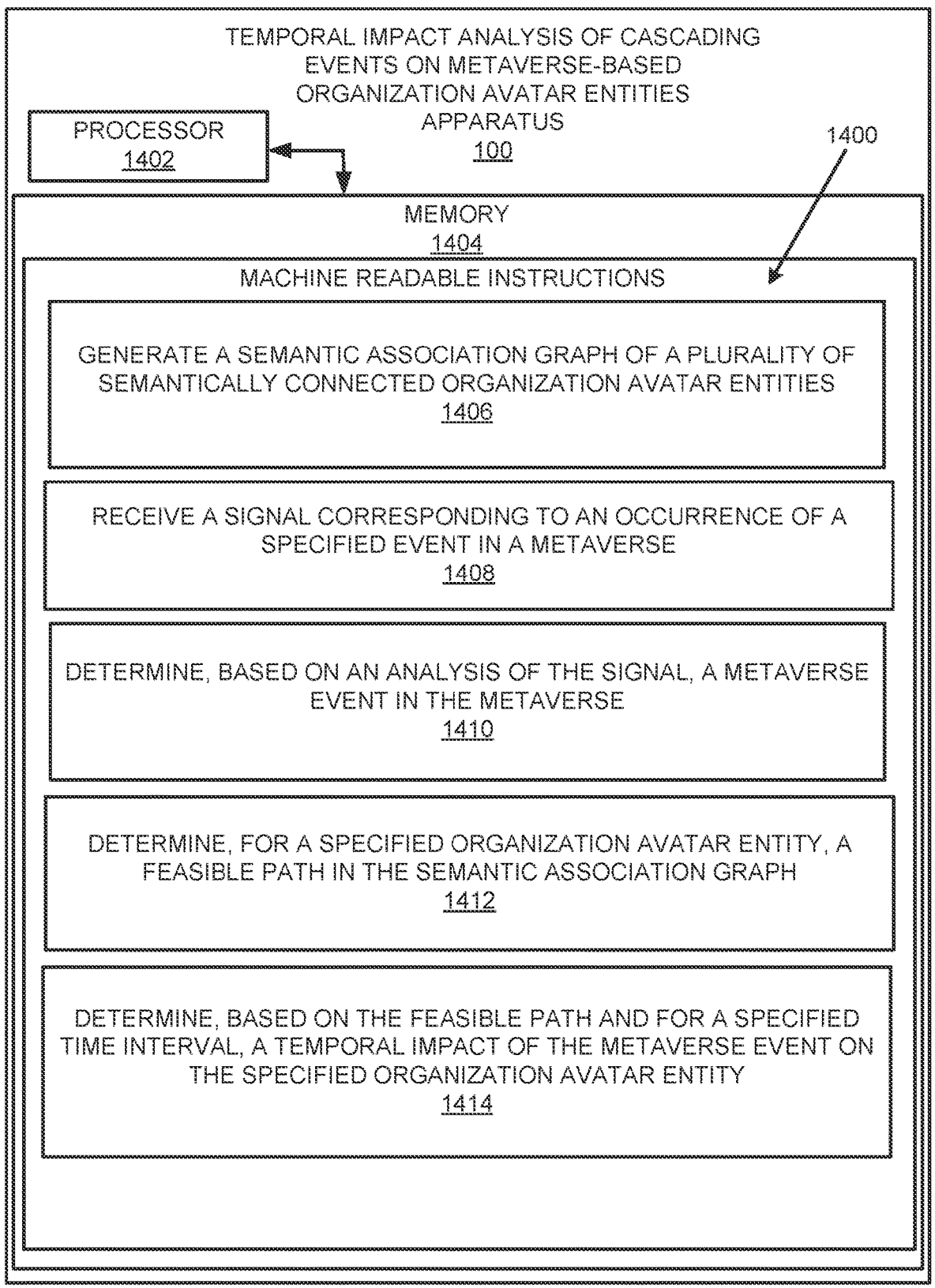
FIG. 14 illustrates an example block diagram for temporal impact analysis of cascading events on metaverse-based organization avatar entities, in accordance with an example of the present disclosure.
Figure 14:
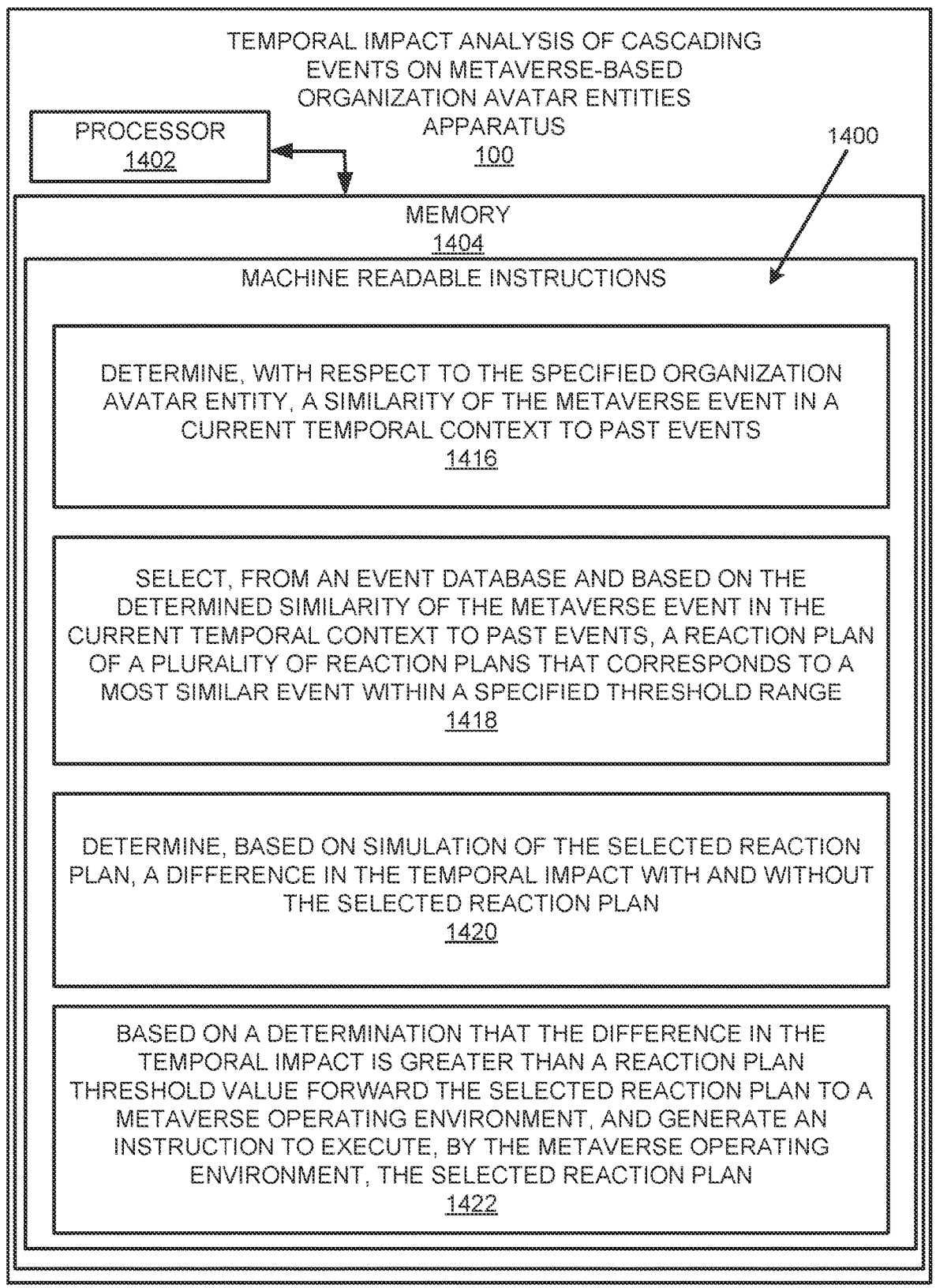
Figure 16:
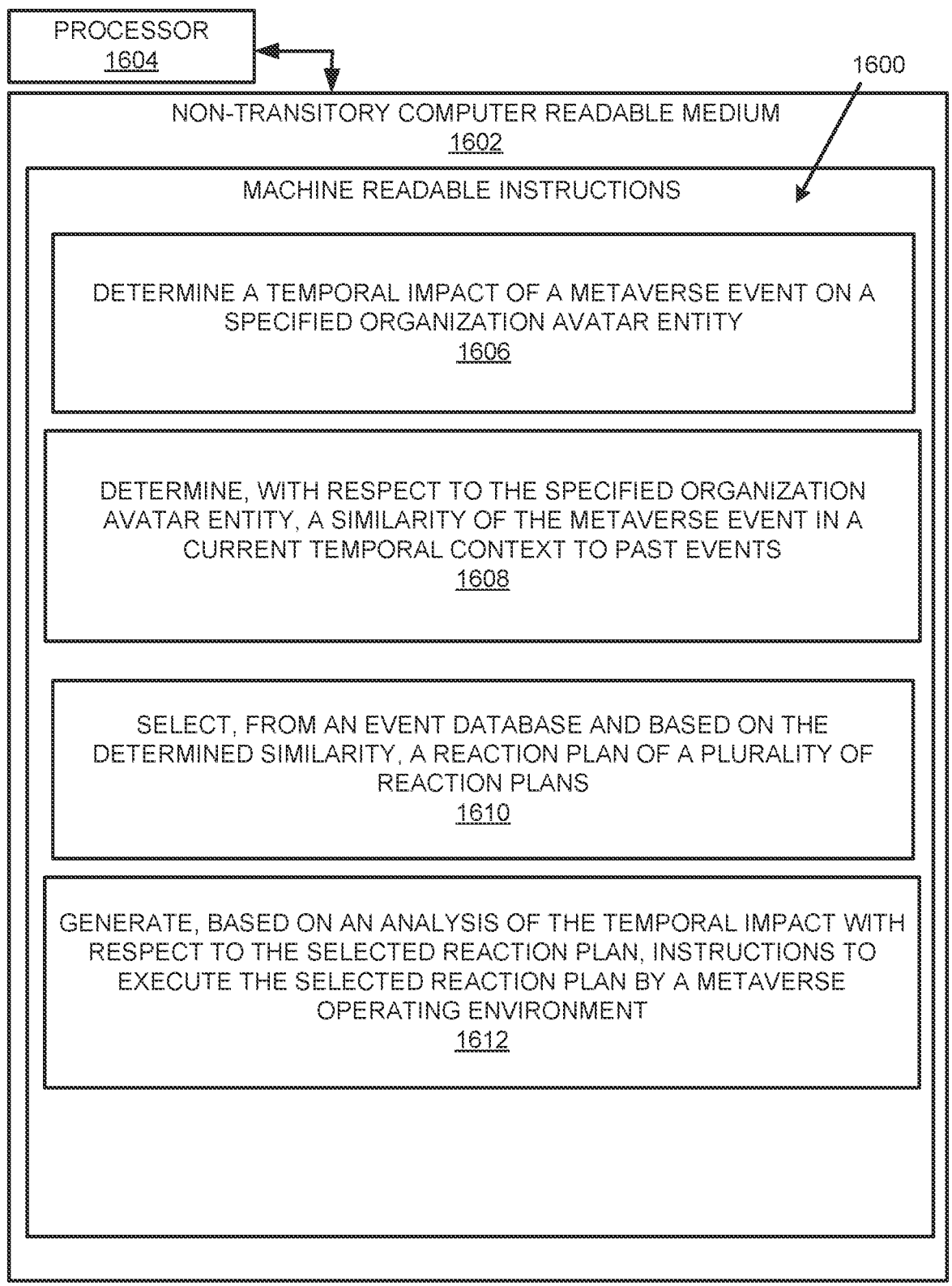
FIG. 16 illustrates a further example block diagram for temporal impact analysis of cascading events on metaverse-based organization avatar entities, in accordance with another example of the present disclosure.

FIGS. 14-16 respectively illustrate an example block diagram 1400, a flowchart of an example method 1500, and a further example block diagram 1600 for temporal impact analysis of cascading events on metaverse-based organization avatar entities, according to examples. The block diagram 1400, the method 1500, and the block diagram 1600 may be implemented on the apparatus 100 described above with reference to FIG. 1 by way of example and not of limitation. The block diagram 1400, the method 1500, and the block diagram 1600 may be practiced in other apparatus. In addition to showing the block diagram 1400, FIG. 14 shows hardware of the apparatus 100 that may execute the instructions of the block diagram 1400. The hardware may include a processor 1402, and a memory 1404 storing machine readable instructions that when executed by the processor cause the processor to perform the instructions of the block diagram 1400. The memory 1404 may represent a non-transitory computer readable medium. FIG. 15 may represent an example method for temporal impact analysis of cascading events on metaverse-based organization avatar entities, and the steps of the method. FIG. 16 may represent a non-transitory computer readable medium 1602 having stored thereon machine readable instructions to provide temporal impact analysis of cascading events on metaverse-based organization avatar entities according to an example. The machine readable instructions, when executed, cause a processor 1604 to perform the instructions of the block diagram 1600 also shown in FIG. 16.

The processor 1402 of FIG. 14 and/or the processor 1604 of FIG. 16 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1602 of FIG. 16), such as hardware storage devices (e.g., RAM (random access memory), ROM (read only memory), EPROM (erasable, programmable ROM), EEPROM (electrically erasable, programmable ROM), hard drives, and flash memory). The memory 1404 may include a RAM, where the machine readable instructions and data for a processor may reside during runtime.

Referring to FIGS. 1-14, and particularly to the block diagram 1400 shown in FIG. 14, the memory 1404 may include instructions 1406 to generate a semantic association graph 104 of a plurality of semantically connected organization avatar entities 106.

The processor 1402 may fetch, decode, and execute the instructions 1408 to receive a signal 108 corresponding to an occurrence of a specified event 110 in a metaverse 112.

The processor 1402 may fetch, decode, and execute the instructions 1410 to determine, based on an analysis of the signal 108, a metaverse event 114 in the metaverse 112.

The processor 1402 may fetch, decode, and execute the instructions 1412 to determine, for a specified organization avatar entity 116, a feasible path 118 in the semantic association graph 104.

The processor 1402 may fetch, decode, and execute the instructions 1414 to determine, based on the feasible path 118 and for a specified time interval, a temporal impact 122 of the metaverse event 114 on the specified organization avatar entity 116.

The processor 1402 may fetch, decode, and execute the instructions 1416 to determine, with respect to the specified organization avatar entity 116, a similarity of the metaverse event 114 in a current temporal context to past events.

The processor 1402 may fetch, decode, and execute the instructions 1418 to select, from an event database 126 and based on the determined similarity of the metaverse event 114 in the current temporal context to past events, a reaction plan 128 of a plurality of reaction plans 130 that corresponds to a most similar event within a specified threshold range 132.

The processor 1402 may fetch, decode, and execute the instructions 1420 to determine, based on simulation of the selected reaction plan 128, a difference in the temporal impact 122 with and without the selected reaction plan 128.

The processor 1402 may fetch, decode, and execute the instructions 1422 to based on a determination that the difference in the temporal impact 122 is greater than a reaction plan threshold value 134, forward the selected reaction plan 128 to a metaverse operating environment 136, and generate an instruction to execute, by the metaverse operating environment 136, the selected reaction plan 128.

Referring to FIGS. 1-13 and 15, and particularly FIG. 15, for the method 1500, at block 1502, the method may include determining, for a specified time interval, a temporal impact 122 of a metaverse event 114 on a specified organization avatar entity 116.

At block 1504, the method may include determining, with respect to the specified organization avatar entity 116, a similarity of the metaverse event 114 in a current temporal context to past events, At block 1506, the method may include selecting, from an event database 126 and based on the determined similarity of the metaverse event 114 in the current temporal context to past events, a reaction plan 128 of a plurality of reaction plans that corresponds to a most similar event within a specified threshold range 132.

At block 1508, the method may include determining, based on a simulation of the selected reaction plan 128, a difference in the temporal impact 122 with and without the selected reaction plan 128.

At block 1510, the method may include generating, based on a determination that the difference in the temporal impact 122 is greater than a reaction plan threshold value 134, instructions to execute the selected reaction plan 128 by a metaverse operating environment 136.

Referring to FIGS. 1-13 and 16, and particularly FIG. 16, for the block diagram 1600, the non-transitory computer readable medium 1602 may include instructions 1606 to determine a temporal impact 122 of a metaverse event 114 on a specified organization avatar entity 116.

The processor 1604 may fetch, decode, and execute the instructions 1608 to determine, with respect to the specified organization avatar entity 116, a similarity of the metaverse event 114 in a current temporal context to past events.

The processor 1604 may fetch, decode, and execute the instructions 1610 to select, from an event database 126 and based on the determined similarity, a reaction plan 128 of a plurality of reaction plans.

The processor 1604 may fetch, decode, and execute the instructions 1612 to generate, based on an analysis of the temporal impact 122 with respect to the selected reaction plan 128, instructions to execute the selected reaction plan 128 by a metaverse operating environment 136.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless ether vise indicated.

What is claimed is:

1. A temporal impact analysis of cascading events on metaverse-based organization avatar entities apparatus comprising:
   at least one hardware processor;
   a reachability analyzer, executed by the at least one hardware processor, to:
      generate a semantic association graph of a plurality of semantically connected organization avatar entities;
      receive a signal corresponding to an occurrence of a specified event in a metaverse;
      determine, based on an analysis of the signal, a metaverse event in the metaverse; and determine, for a specified organization avatar entity, a feasible path in the semantic association graph;

an impact analyzer, executed by the at least one hardware processor, to determine, based on the feasible path and for a specified time interval, a temporal impact of the metaverse event on the specified organization avatar entity; and an event similarity reaction analyzer, executed by the at least one hardware processor, to:

determine, with respect to the specified organization avatar entity, a similarity of the metaverse event in a current temporal context to past events;

select, from an event database and based on the determined similarity of the metaverse event in the current temporal context to past events, a reaction plan of a plurality of reaction plans that corresponds to a most similar event within a specified threshold range;

determine, based on simulation of the selected reaction plan, a difference in the temporal impact with and without the selected reaction plan; and based on a determination that the difference in the temporal impact is greater than a reaction plan threshold value:

forward the selected reaction plan to a metaverse operating environment; and generate an instruction to execute, by the metaverse operating environment, the selected reaction plan.

2. The temporal impact analysis of cascading events on metaverse-based organization avatar entities apparatus according to claim 1, wherein the reachability analyzer is executed by the at least one hardware processor, to determine, for the semantic association graph, a sequence of logically connected properties by applying at least one derivation procedure, wherein each logically connected property corresponds to a causally connected event.

3. The temporal impact analysis of cascading events on metaverse-based organization avatar entities apparatus according to claim 1, wherein the reachability analyzer is executed by the at least one hardware processor to generate the semantic association graph of the plurality of semantically connected organization avatar entities by representing:

associations between the organization avatar entities as edges; and strengths of the associations between the organization avatar entities as weights of the edges.

4. The temporal impact analysis of cascading events on metaverse-based organization avatar entities apparatus according to claim 1, wherein the reachability analyzer is executed by the at least one hardware processor, to:

determine, for the specified organization avatar entity, paths in the semantic association graph from a set of specified entities to the specified organization avatar entity;

determine a likelihood of cascading of the metaverse event along each path of the determined paths;

designate, based on the determined likelihood of cascading, each path of the determined paths for which an event cascade likelihood is greater than a specified event cascade threshold as a feasible path;

determine, for each feasible path, a reachability; and select, based on the determined reachability for each feasible path, a feasible path that includes a maximum reachability as the feasible path for the specified organization avatar entity.

5. The temporal impact analysis of cascading events on metaverse-based organization avatar entities apparatus according to claim 4, wherein the impact analyzer is executed by the at least one hardware processor to:

determine, for the feasible path that includes the maximum reachability, if there exists a sequence of logically connected properties that are in successive states of entities along the feasible path.

6. The temporal impact analysis of cascading events on metaverse-based organization avatar entities apparatus according to claim 1, wherein the impact analyzer is executed by the at least one hardware processor to:

determine, based on a determination that the signal reaches the specified organization avatar entity, a plurality of state transitions until the specified organization avatar entity reaches a stationary state.

7. The temporal impact analysis of cascading events on metaverse-based organization avatar entities apparatus according to claim 1, wherein the event database includes:

states in which organization avatar entities were before occurrence of past events;

states that the organization avatar entities transitioned to due to occurrence of events;

for the organization avatar entities, the plurality of reaction plans as a set of computable actions; and effectiveness coefficients associated with the plurality of reaction plans.

8. The temporal impact analysis of cascading events on metaverse-based organization avatar entities apparatus according to claim 1, wherein the event similarity reaction analyzer is executed by the at least one hardware processor to:

generate, based on a determination that the difference in the temporal impact is less than or equal to the reaction plan threshold value, an indication of no known feasible action.

9. A method for temporal impact analysis of cascading events on metaverse-based organization avatar entities, the method comprising:

determining, by at least one hardware processor, for a specified time interval, a temporal impact of a metaverse event on a specified organization avatar entity;

determining, by the at least one hardware processor, with respect to the specified organization avatar entity, a similarity of the metaverse event in a current temporal context to past events;

selecting, by the at least one hardware processor, from an event database and based on the determined similarity of the metaverse event in the current temporal context to past events, a reaction plan of a plurality of reaction plans that corresponds to a most similar event within a specified threshold range;

determining, by the at least one hardware processor, based on a simulation of the selected reaction plan, a difference in the temporal impact with and without the selected reaction plan; and generating, by the at least one hardware processor and based on a determination that the difference in the temporal impact is greater than a reaction plan threshold value, instructions to execute the selected reaction plan by a metaverse operating environment.

10. The method according to claim 9, further comprising:

determining, by the at least one hardware processor, for the specified organization avatar entity, a feasible path in a semantic association graph of a plurality of semantically connected organization avatar entities.

11. The method according to claim 10, further comprising:

determining, by the at least one hardware processor, for the specified organization avatar entity, paths in the semantic association graph from a set of specified entities to the specified organization avatar entity;

determining, by the at least one hardware processor, a likelihood of cascading of the metaverse event along each path of the determined paths;

designating, by the at least one hardware processor, based on the determined likelihood of cascading, each path of the determined paths for which an event cascade likelihood is greater than a specified event cascade threshold as a feasible path;

determining, by the at least one hardware processor, for each feasible path, a reachability, and selecting, by the at least one hardware processor, based on the determined reachability for each feasible path, a feasible path that includes a maximum reachability as the feasible path for the specified organization avatar entity.

12. The method according to claim 11, further comprising:

determining, by the at least one hardware processor, for the feasible path that includes the maximum reachability, if there exists a sequence of logically connected properties that are in successive states of entities along the feasible path.

13. The method according to claim 9, further comprising:

receiving, by the at least one hardware processor, a signal corresponding to an occurrence of a specified event in a metaverse; and determining, by the at least one hardware processor, based on an analysis of the signal, the metaverse event in the metaverse.

14. The method according to claim 13, further comprising:

determining, by the at least one hardware processor, based on a determination that the signal reaches the specified organization avatar entity, a plurality of state transitions until the specified organization avatar entity reaches a stationary state.

15. The method according to claim 9, further comprising:

generating, by the at least one hardware processor, based on a determination that the difference in the temporal impact is less than or equal to the reaction plan threshold value, an indication of no known feasible action.

16. A non-transitory computer readable medium having stored thereon machine readable instructions, the machine readable instructions, when executed by at least one hardware processor, cause the at least one hardware processor to:

determine a temporal impact of a metaverse event on a specified organization avatar entity;

determine, with respect to the specified organization avatar entity, a similarity of the metaverse event in a current temporal context to past events;

select, from an event database and based on the determined similarity, a reaction plan of a plurality of reaction plans; and generate, based on an analysis of the temporal impact with respect to the selected reaction plan, instructions to execute the selected reaction plan by a metaverse operating environment.

17. The non-transitory computer readable medium according to claim 16, wherein the machine readable instructions to select, from the event database and based on the determined similarity, the reaction plan of the plurality of reaction plans, when executed by the at least one hardware processor, further cause the at least one hardware processor to:

select, from the event database and based on the determined similarity, the reaction plan of the plurality of reaction plans that corresponds to a most similar event within a specified threshold range.

18. The non-transitory computer readable medium according to claim 16, wherein the machine readable instructions to generate, based on the analysis of the temporal impact with respect to the selected reaction plan, instructions to execute the selected reaction plan by the metaverse operating environment, when executed by the at least one hardware processor, further cause the at least one hardware processor to:

determine, based on a simulation of the selected reaction plan, a difference in the temporal impact with and without the selected reaction plan.

19. The non-transitory computer readable medium according to claim 16, wherein the machine readable instructions to generate, based on the analysis of the temporal impact with respect to the selected reaction plan, instructions to execute the selected reaction plan by the metaverse operating environment, when executed by the at least one hardware processor, further cause the at least one hardware processor to:

generate, based on a determination that a difference in the temporal impact with and without the selected reaction plan is greater than a reaction plan threshold value, the instructions to execute the selected reaction plan by the metaverse operating environment.

20. The non-transitory computer readable medium according to claim 16, wherein the machine readable instructions, when executed by the at least one hardware processor, further cause the at least one hardware processor to:

generate, based on a determination that a difference in the temporal impact with and without the selected reaction plan is less than or equal to a reaction plan threshold value, an indication of no known feasible action.

* * * * *